(12) United States Patent
Li et al.

(10) Patent No.: US 12,267,503 B2
(45) Date of Patent: Apr. 1, 2025

(54) METHODS, APPARATUS, AND NON-TRANSITORY COMPUTER READABLE MEDIUM FOR CROSS-COMPONENT SAMPLE ADAPTIVE OFFSET

(71) Applicant: Alibaba (China) Co., Ltd., Zhejiang (CN)

(72) Inventors: Xinwei Li, Beijing (CN); Jie Chen, Beijing (CN); Ru-Ling Liao, Beijing (CN); Yan Ye, San Mateo, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/504,282

(22) Filed: Nov. 8, 2023

(65) Prior Publication Data

US 2024/0080448 A1    Mar. 7, 2024

Related U.S. Application Data

(63) Continuation of application No. 17/651,338, filed on Feb. 16, 2022, now Pat. No. 11,849,117.

(60) Provisional application No. 63/160,864, filed on Mar. 14, 2021.

(51) Int. Cl.
*H04N 19/00* (2014.01)
*H04N 19/132* (2014.01)
*H04N 19/169* (2014.01)
*H04N 19/186* (2014.01)
*H04N 19/46* (2014.01)

(52) U.S. Cl.
CPC ......... *H04N 19/132* (2014.11); *H04N 19/186* (2014.11); *H04N 19/1883* (2014.11); *H04N 19/46* (2014.11)

(58) Field of Classification Search
CPC ............... H04N 19/132; H04N 19/186; H04N 19/1883; H04N 19/46
See application file for complete search history.

(56) References Cited

U.S. PATENT DOCUMENTS

2020/0366918 A1    11/2020    Erfurt et al.

FOREIGN PATENT DOCUMENTS

| CN | 105120270 A | 12/2015 |
| JP | 2015088826 A | 5/2015 |
| JP | 2016527793 A | 9/2016 |
| WO | WO2021025168 A1 | 2/2021 |

(Continued)

OTHER PUBLICATIONS

Call for New generation AVS3 video coding proposals, AVS-N2509, Dec. 2017, 4 pages.

(Continued)

*Primary Examiner* — Zhihan Zhou
(74) *Attorney, Agent, or Firm* — Finnegan, Henderson, Farabow, Garrett & Dunner, LLP

(57) ABSTRACT

The present disclosure provides a video data processing method for cross-component sample adaptive offset (CCSAO). The method includes determining an index based on a vertical coordinate of a chroma sample within a picture; determining a luma sample based on the index; classifying the chroma sample based on a reconstructed value associated with the luma sample; determining an offset based on the classification; and adding the offset to a reconstructed value associated with the chroma sample.

11 Claims, 20 Drawing Sheets

(56) References Cited

FOREIGN PATENT DOCUMENTS

| WO | WO-2022164757 A1 | * | 8/2022 | ........... H04N 19/117 |
| WO | WO2022193917 A1 | | 9/2022 | |

OTHER PUBLICATIONS

HPM, tp://47.93.196.121/Public/codec/video codec/HPM.
Jian et al., "CE 4-1 related : Improvement on CCSAO" , AVS-M5794, 5 pages, Oct. 2020.
Jian et al., "CE 3-1 related: Improvement on CCSAO," AVS M6110, 5 pages, Feb. 23, 2021.
Kuo et al., "CE4-1: Cross-component Sample Adaptive Offset", AVS-M5800, 9 pages, Oct. 2020.
Kuo et al., "CE2-related: Alternative set for CCSAO," Audio Video Coding Standard Workgroup of China, AVS M5888, 6 pages Dec. 2020.
Liang F., "AVS3-P2(CD4.0)", AVS-N2724, Aug. 2019, 228 pages.
PCT International Search Report and Written Opinion mailed May 17, 2022, issued in corresponding International Application No. PCT/CN2022/077333 (6 pgs.).

* cited by examiner

METHODS, APPARATUS, AND NON-TRANSITORY COMPUTER READABLE MEDIUM FOR CROSS-COMPONENT SAMPLE ADAPTIVE OFFSET

CROSS-REFERENCE TO RELATED APPLICATIONS

The present disclosure is a continuation of U.S. application Ser. No. 17/651,338, filed Feb. 16, 2022, which claims the benefits of priority to U.S. Provisional Application No. 63/160,864, filed on Mar. 14, 2021, which is incorporated herein by reference in its entirety.

TECHNICAL FIELD

The present disclosure generally relates to video processing, and more particularly, to methods, apparatus, and non-transitory computer readable medium for cross-component sample adaptive offset.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for cross-component sample adaptive offset. The method includes determining an index based on a vertical coordinate of a chroma sample within a picture; determining a luma sample based on the index; classifying the chroma sample based on a reconstructed value associated with the luma sample; determining an offset based on the classification; and adding the offset to a reconstructed value associated with the chroma sample.

Embodiments of the present disclosure provide an apparatus for performing video data processing, the apparatus comprises a memory figured to store instructions; and one or more processors configured to execute the instructions to cause the apparatus to perform determining an index based on a vertical coordinate of a chroma sample within a picture; determining a luma sample based on the index; classifying the chroma sample based on a reconstructed value associated with the luma sample; determining an offset based on the classification; and adding the offset to a reconstructed value associated with the chroma sample.

Embodiments of the present disclosure provide a non-transitory computer readable medium that stores a set of instructions that is executable by one or more processors of an apparatus to cause the apparatus to initiate a method for performing video data processing. The method includes determining an index based on a vertical coordinate of a chroma sample within a picture; determining a luma sample based on the index; classifying the chroma sample based on a reconstructed value associated with the luma sample; determining an offset based on the classification; and adding the offset to a reconstructed value associated with the chroma sample.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
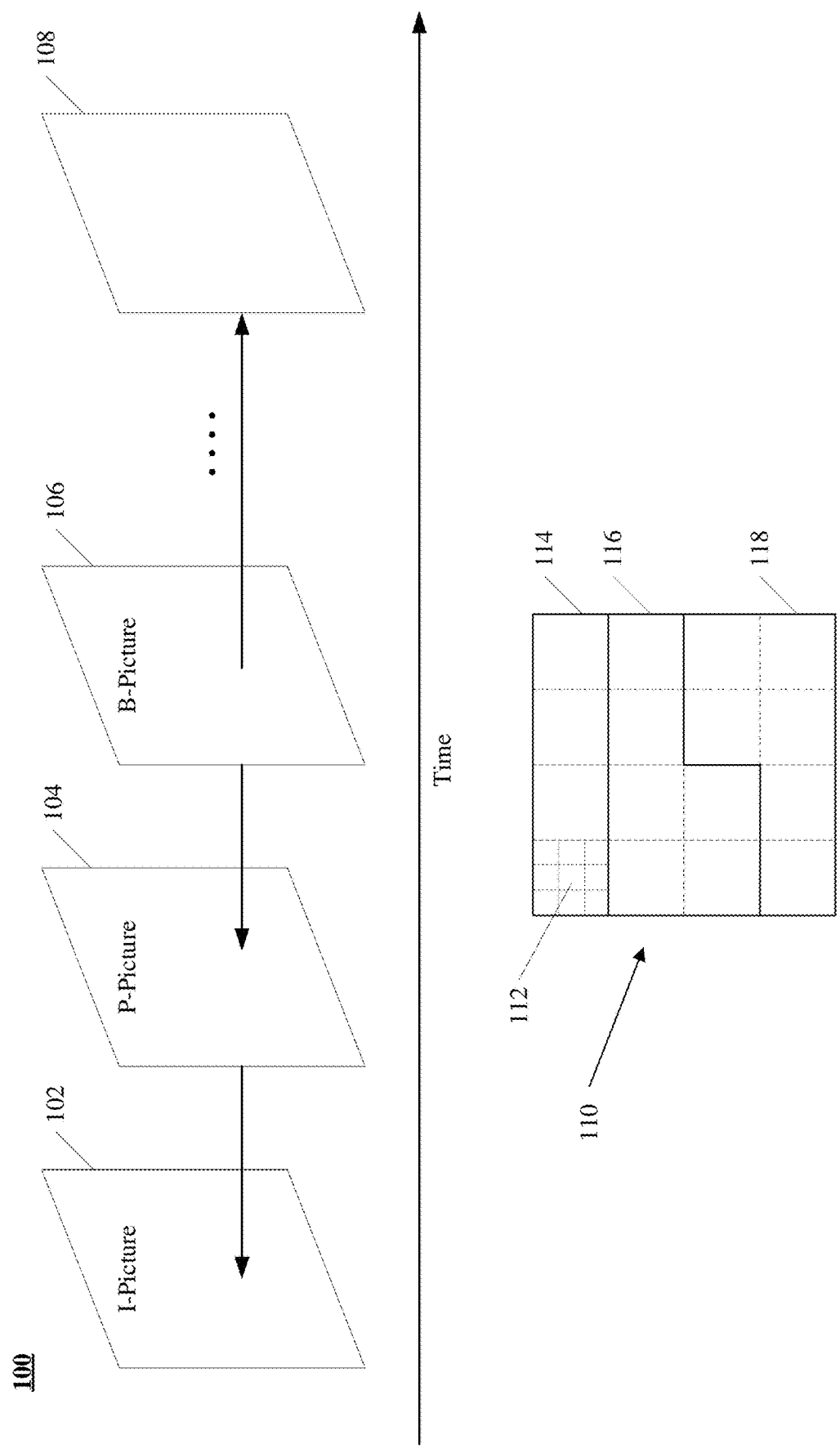
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

New standards for video coding are being developed in the industry. For example, the Audio Video coding Standard ("AVS") Workgroup is developing a third generation of AVS video standard, namely AVS3. High Performance Model ("HPM") has been chosen by the workgroup as a new reference software platform for AVS3. The first phase of the AVS3 standard was able to achieve more than 20% coding performance gain over its predecessor AVS2, and the second phase of the AVS3 standard is still under development.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC), or as "largest coding units" ("LCUs") in some other video coding standards (e.g., AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
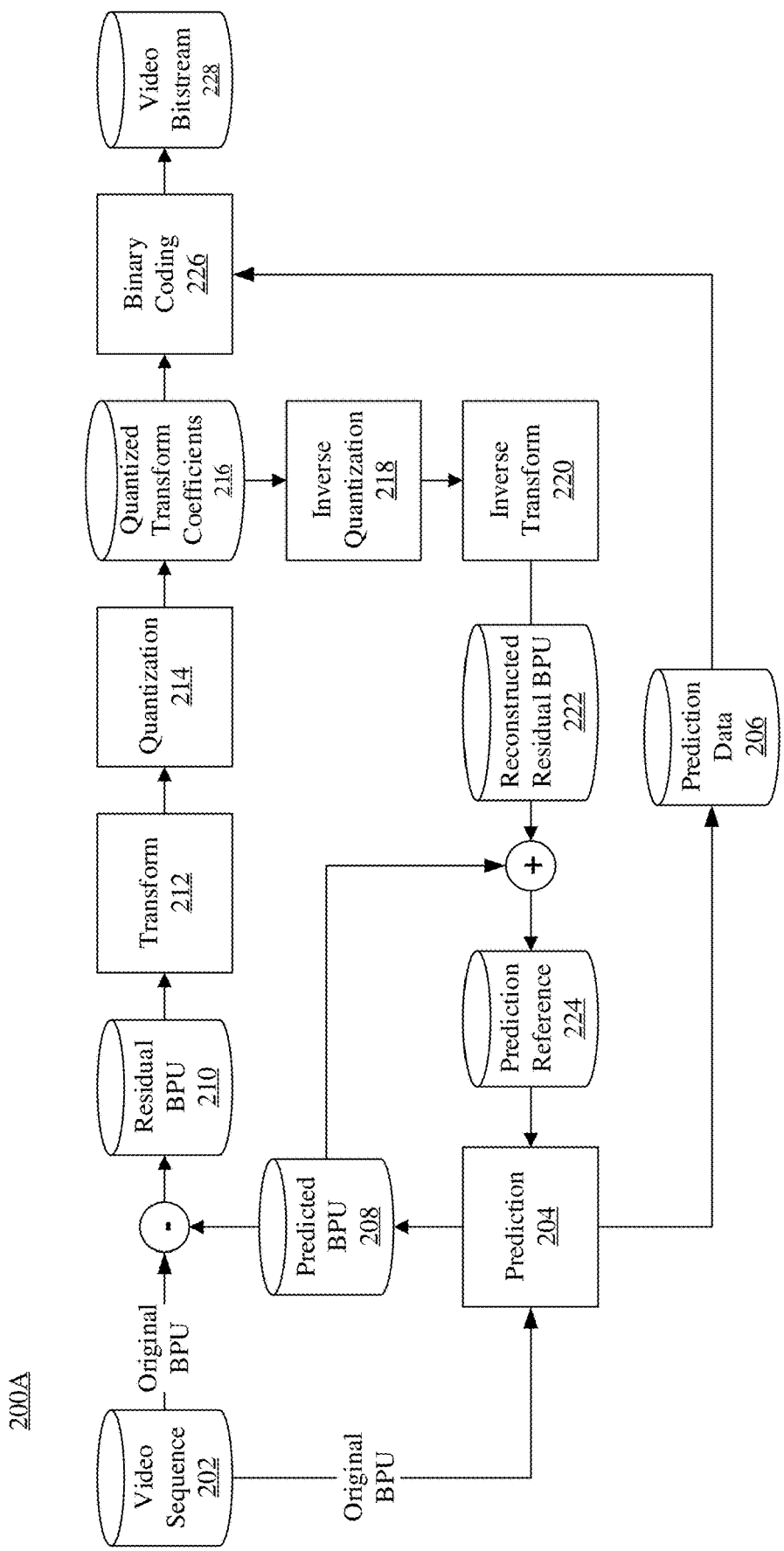
FIG. 2A is a schematic diagram illustrating an exemplary encoding process performed by a hybrid video coding system, consistent with embodiments of the present disclosure.
Figure 2B:
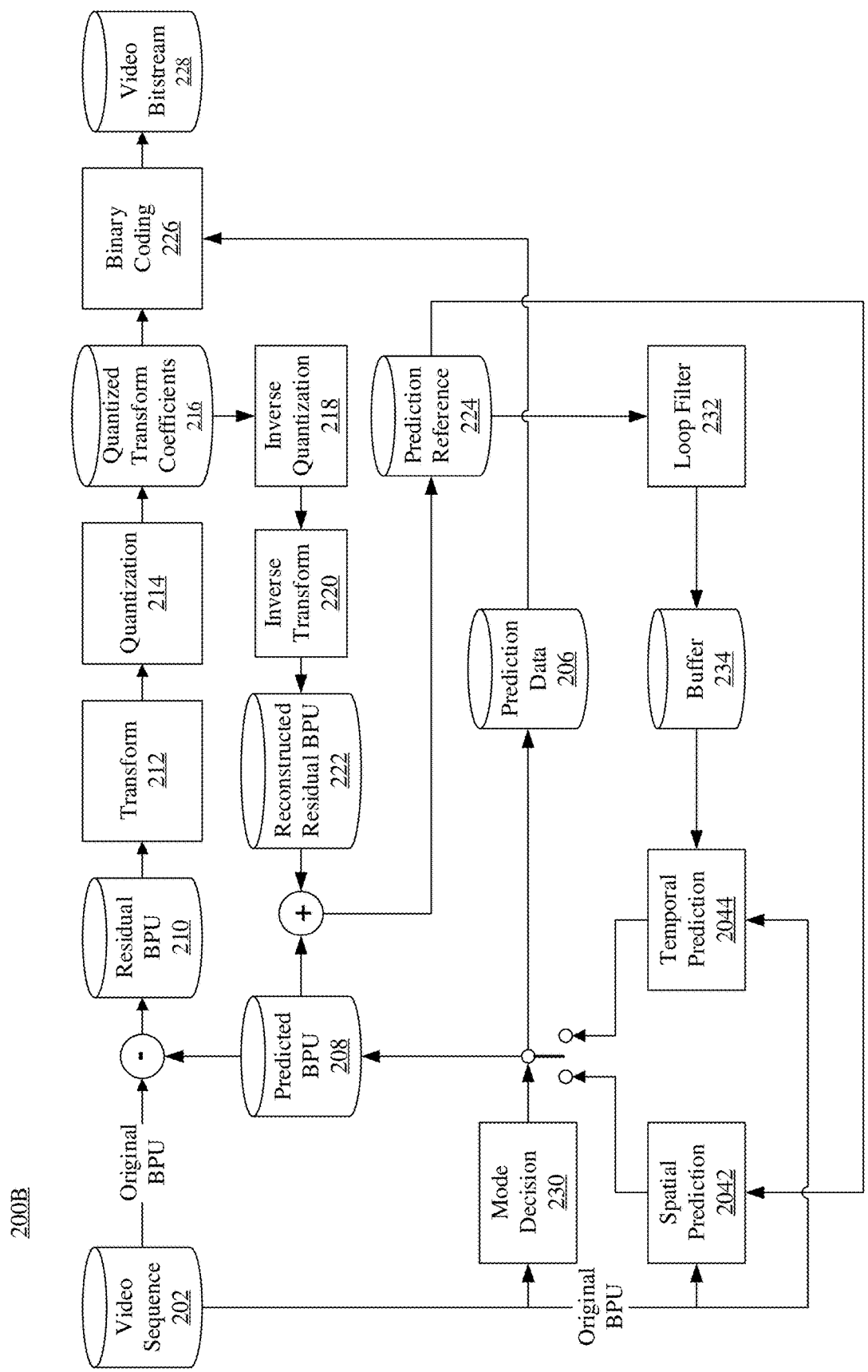
FIG. 2B is a schematic diagram illustrating another exemplary encoding process performed by a hybrid video coding system, consistent with embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets (SAOs), adaptive loop filters (ALFs), or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
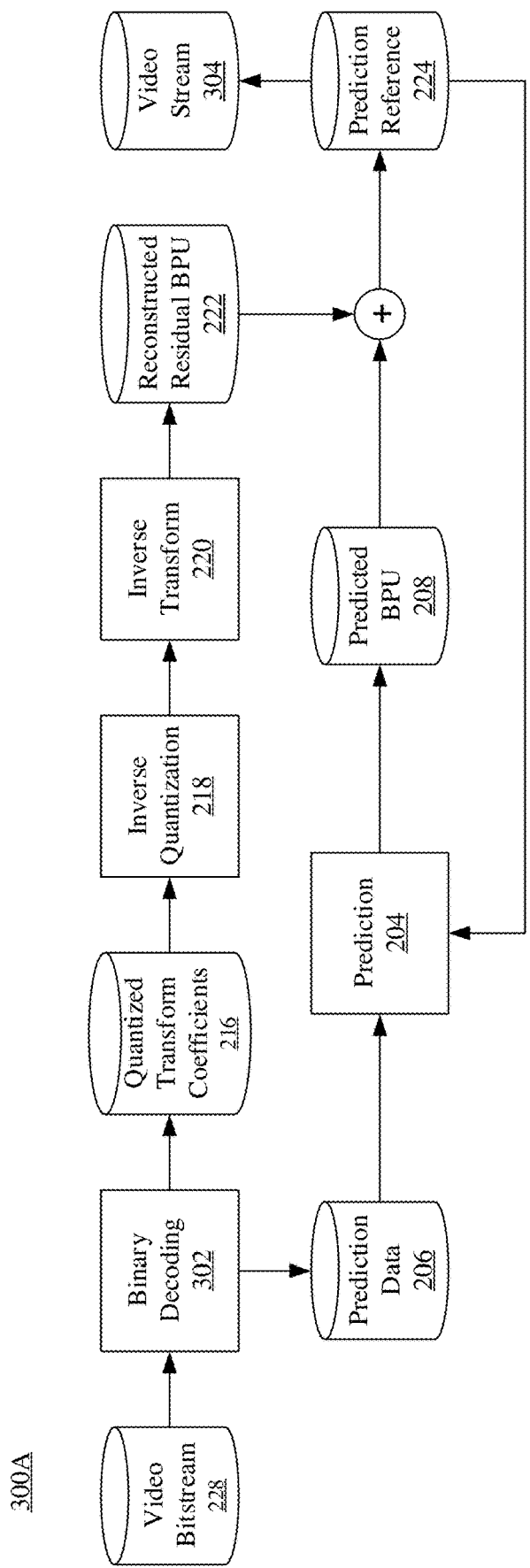
FIG. 3A is a schematic diagram illustrating an exemplary decoding process performed by a hybrid video coding system, consistent with embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
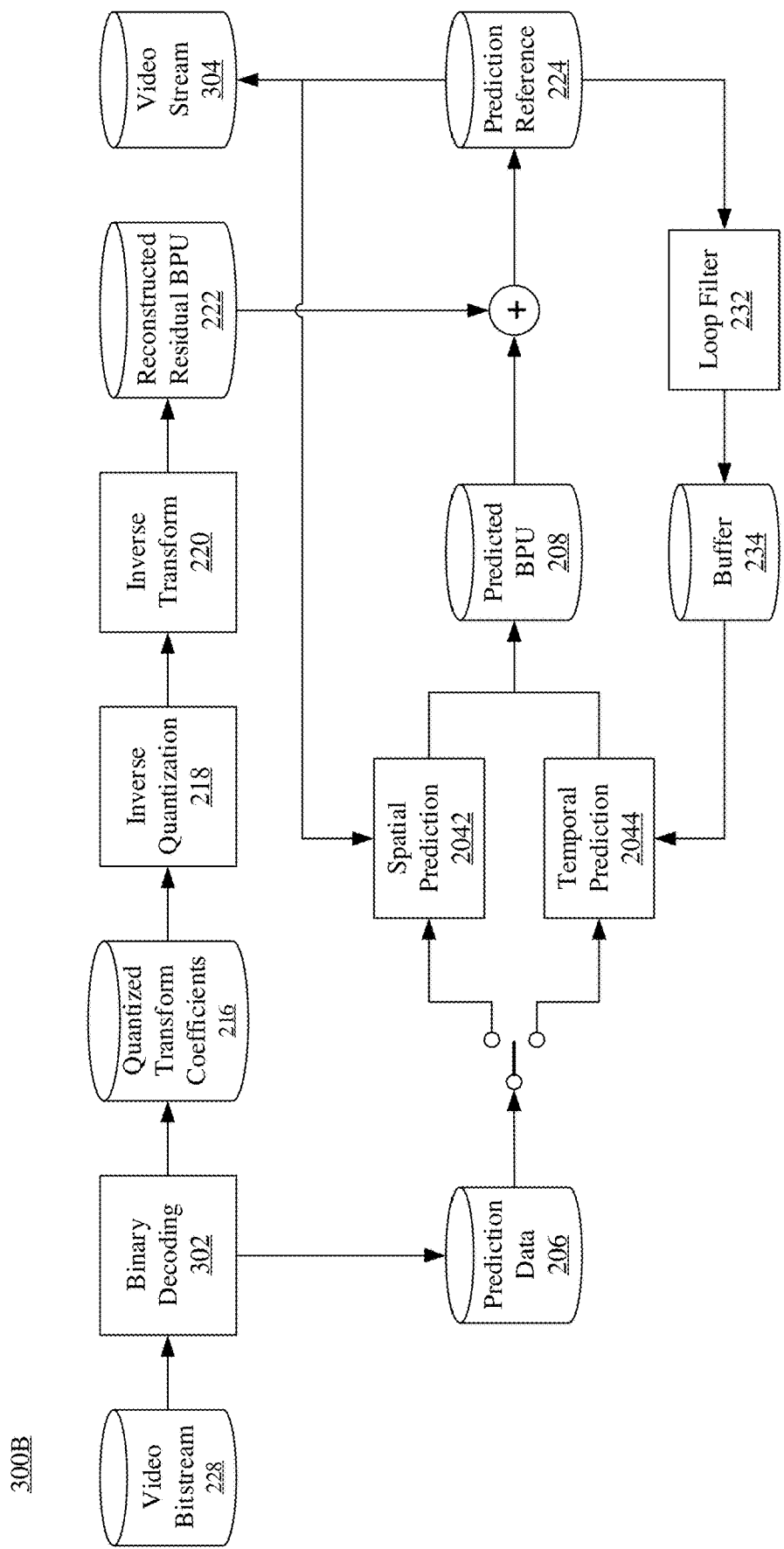
FIG. 3B is a schematic diagram illustrating another exemplary decoding process performed by a hybrid video coding system, consistent with embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
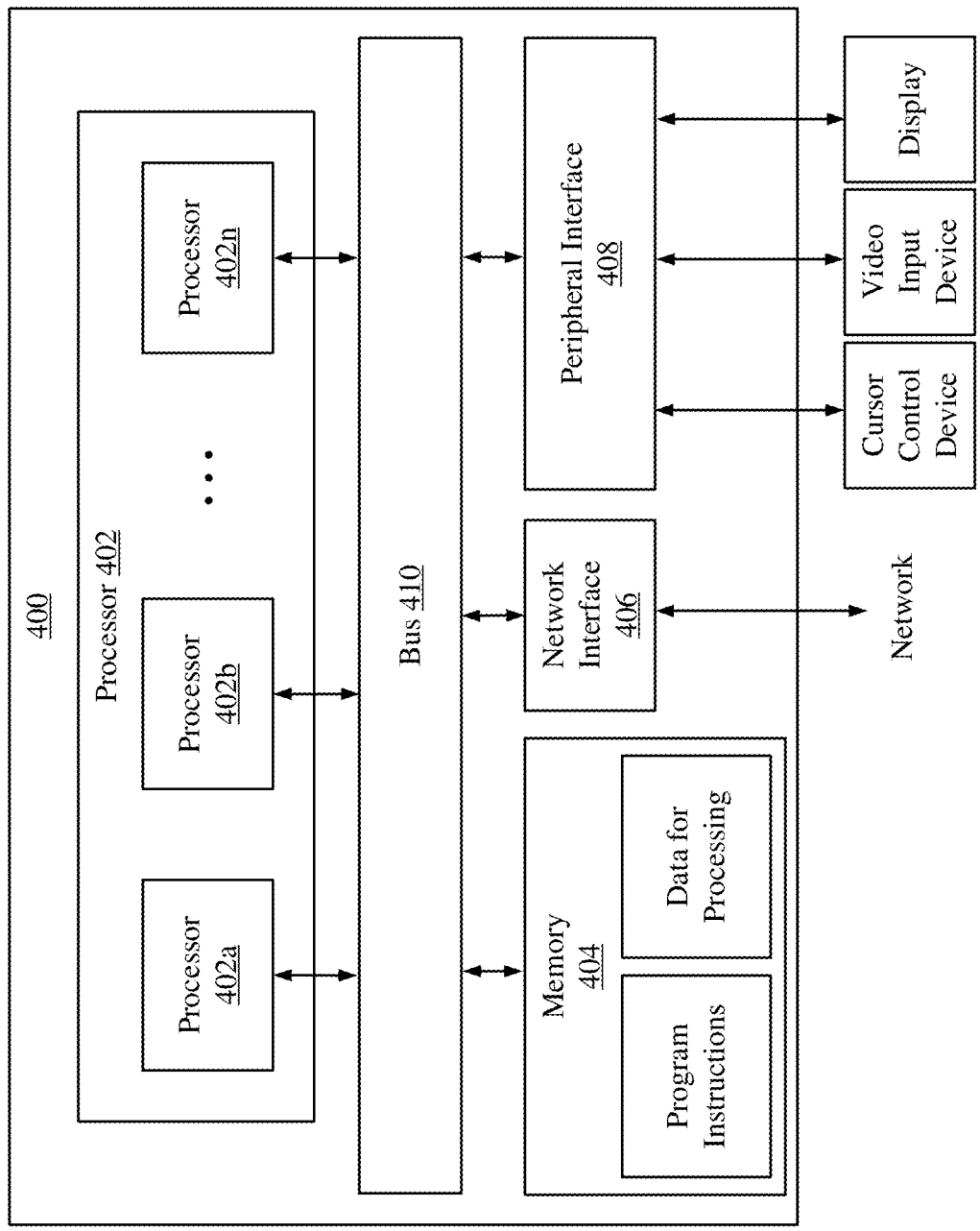
FIG. 4 is a block diagram of an exemplary apparatus for encoding or decoding video data, according to some embodiments of the present disclosure.

FIG. 4 is a block diagram of an example apparatus 400 for encoding or decoding video data, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The key idea of sample adaptive offset (SAO) in video processing technologies (e.g., AVS3) is classifying samples into different categories, obtaining an offset for each category, and then adding the offset to each sample. The index of the classification methods and the offsets of each category are signaled for each Coding Tree Unit (CTU), such that SAO parameters are adapted from CTU to CTU.

There are two types of classification methods: edge offset (EO) and band offset (BO). For EO, the sample classification is based on a comparison between the current sample value and neighboring sample values. For BO, the sample classification is based on the sample value band.

Figure 5:
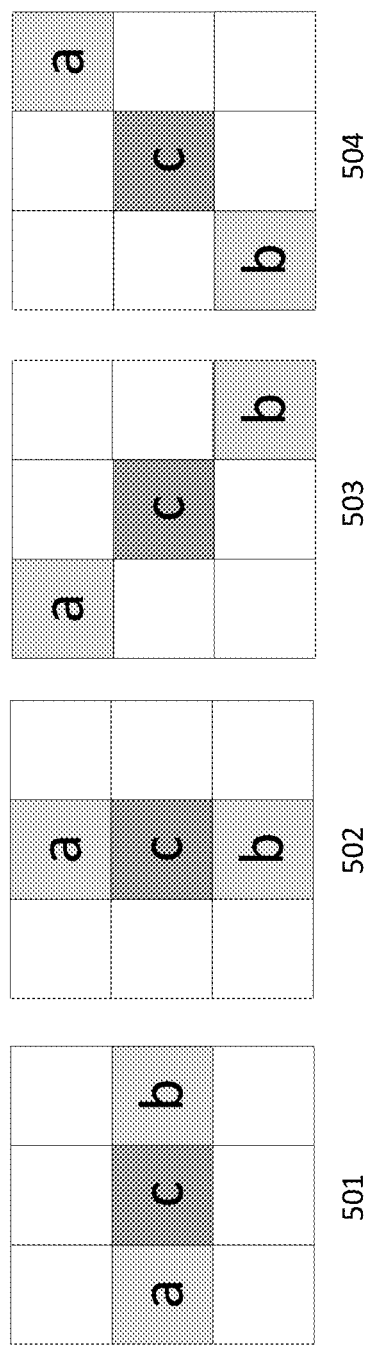
FIG. 5 illustrates four Edge Offset (EO) patterns used in Sample Adaptive Offset (SAO), according to some embodiments of the present disclosure.

For EO, each sample in a CTU is classified into one of five categories based on the current sample and the neighbors. FIG. 5 illustrates four Edge Offset (EO) patterns used in Sample Adaptive Offset (SAO), according to some embodiments of the present disclosure. As shown in FIG. 5, there are 4 EO patterns 501-504, in which "c" represents the current sample, and "a" and "b" represent two neighboring samples. Table 1 shows exemplary classification rules for determining the category for each sample and the offset range.

TABLE 1

Exemplary classification rules and offset ranges of EO in SAO

| Category | Condition | Offset Range |
| --- | --- | --- |
| 1 | c < a && c < b | −1 <= offset <= 6 |
| 2 | (c < a && c == b) \|\| (c == a && c < b) | 0 <= offset <= 1 |
| 3 | (c > a && c == b) \|\| (c == a && c > b) | −1 <= offset <= 0 |
| 4 | c > a && c > b | −6 <= offset <= 1 |
| 0 | None of the above | None |

After a pattern is selected, a category is determined based on the rules in Table 1. Referring to Table 1 and FIG. 5, if the current sample does not belong to EO categories 1 to 4, then the current sample is classified as category 0, and EO is not applied.

For BO, the whole sample value range is equally divided into 32 categories, and offset values are derived for each category and signaled. The range of BO offset is [−7, 7].

In the sequence parameter set (SPS), one flag is used to indicate whether SAO is disabled in the current video sequence. In the slice header, three flags are signaled to indicate whether SAO is enabled for Y, Cb and Cr in the current slice. If SAO is enabled in the current slice, SAO parameters (including merging information, mode information, and offset information) for each CTU are signaled. For each CTU, the SAO parameters of the left CTU or above CTU can be reused. If the current CTU does not merge with a neighboring CTU, the mode and offset information of the current CTU is signaled for luma, Cb and Cr in sequence. For each component, the SAO mode is first signaled to indicate which of the EO, BO, and OFF is selected. If BO is selected, 32 offsets are signaled; if EO is selected, 4 offsets followed by one of the four EO patterns are signaled. According to some embodiments of the present disclosure, only the offsets of some consecutive bands will be signaled when BO is selected.

Moreover, an enhanced Sample Adaptive Offset (ESAO) is adopted in AVS3. When ESAO is enabled in SPS, SAO is set to be disabled. ESAO modifies the classification methods of SAO and uses the same ESAO parameters for the whole frame. The classification methods for luma and chroma are different for ESAO.

Figure 6:
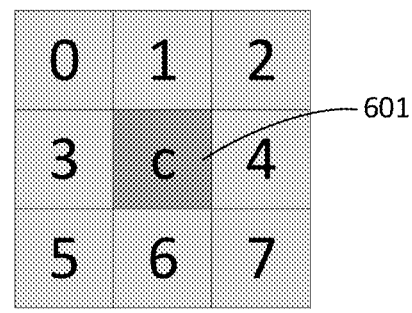
FIG. 6 illustrates a current luma sample and its eight surrounding samples, according to some embodiments of the present disclosure.

For luma, the classification method is based on two dimensions. For a first dimension, the reconstructed luma samples are divided into NEO categories with two enhanced EO methods. FIG. 6 illustrates a current luma sample and eight surrounding samples of the luma sample, according to some embodiments of the present disclosure. As shown in FIG. 6, the value c of current luma sample 601 is compared with the surrounding 8 samples with index from 0 to 7, consecutively. Table 2 shows the exemplary classification results idx_EO of the first dimension by two methods, where $Y_{(i,j)}$ is the current luma sample and $Y_{(k_1,k_2)}$ means the 8 surrounding luma samples.

TABLE 2

Exemplary classification results of the first dimension in ESAO

| Method 1 | Method 2 |
| --- | --- |
| Initial: idx_EO = 8; <br> for $\|k_1 - i\| \le 1, \|k_2 - j\| \le 1$: <br> if $Y_{(k_1,k_2)} > Y_{(i,j)}$: <br> idx_EO+= 1 <br> else if $Y_{(k_1,k_2)} < Y_{(i,j)}$: <br> idx_EO+= −1 | Initial: idx_EO = 0; <br> for $\|k_1 - i\| \le 1, \|k_2 - j\| \le 1$: <br> if $Y_{(k_1,k_2)} > Y_{(i,j)}$: <br> idx_EO+= 1 |

As shown in Table 2, for Method 1, the range of idx_EO is from 0 to 16; therefore, there are 17 categories in total, (i.e., NEG is equal to 17). For Method 2, the range of idx_EO is from 0 to 8; therefore, there are 9 categories in total, (i.e., $N_{EO}$ is equal to 9). A flag is signaled in picture header (PH) to indicate which of the two methods is used.

For a second dimension, the whole luma sample value range is equally divided into $N_{BO}$ categories, as Eq. (1):

$$idx\_BO = (Y_{(i,j)} * N_{BO}) \gg bitdepth \qquad \text{Eq. (1)}$$

where, idx_BO is the classification result of the second dimension, the value of $N_{BO}$ is allowed to change from 1 to 16 for luma samples in AVS3, and bitdepth is the internal coding bit depth.

The final classification result idx_ESAO can be obtained as Eq. (2):

$$idx\_ESAO = idx\_BO * N_{EO} + idx\_EO \qquad \text{Eq. (2)}$$

For chroma samples, only the second dimension is used, which means only BO is used. And $N_{BO}$ is allowed to change from 1 to 272 for chroma samples in AVS3.

For example, in AVS3, if ESAO is enabled, a CTU control flag is further signaled to indicate whether the CTUs in the current picture can be enabled/disabled independently. If the CTU control flag indicates that the CTUs in the current picture cannot be enabled/disabled independently, e.g., the flag is OFF, ESAO is applied to all CTUs. The ESAO offsets are constrained to be within the range [−15, 15] and are signaled separately for each category in PH with truncated unary code.

Figure 7:
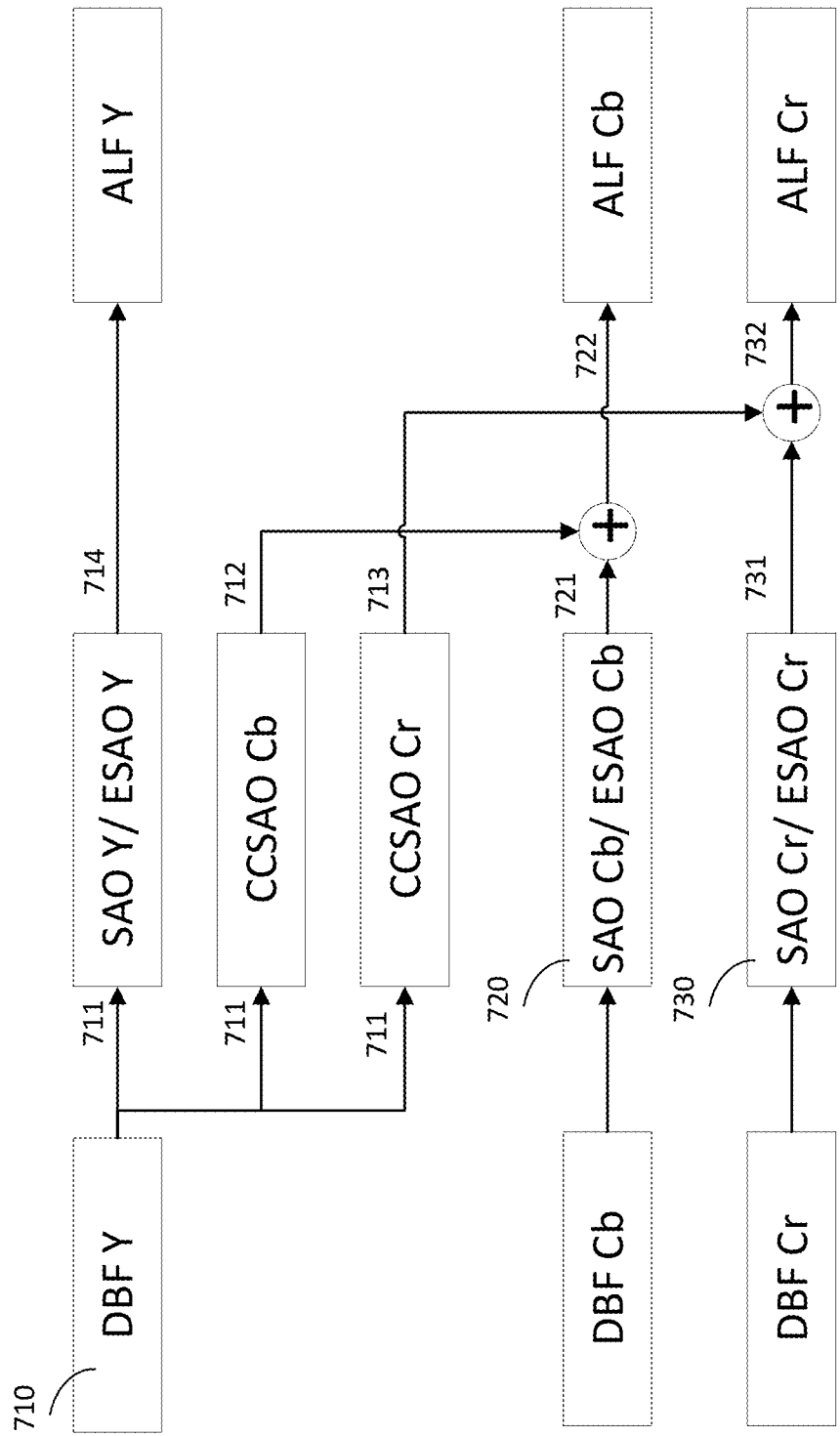
FIG. 7 illustrates a Cross-Component Sample Adaptive Offset (CCSAO) process, according to some embodiments of the present disclosure.

Cross-component Sample Adaptive Offset (CCSAO) is a coding tool to improve the chroma coding efficiency of AVS3. Specifically, for a given chroma sample, the chroma sample is first classified according to a co-located luma sample and then updated by adding one corresponding offset signaled in picture header (PH) on top of the reconstructed value of the chroma sample. FIG. 7 illustrates a Cross-Component Sample Adaptive Offset (CCSAO) process, according to some embodiments of the present disclosure. As shown in FIG. 7, the luma samples 711 output from the de-blocking filter (DBF) 710 are used for the CCSAO classification for chroma samples, and an offset 712, 713 is derived for each category and added to the reconstructed chroma samples 721, 731 output from the Sample Adaptive Offset (SAO) or Enhanced Sample Adaptive Offset (ESAO) 720, 730 to obtain the modified reconstructed chroma samples 722, 732. Then the ALF is performed on the reconstructed luma sample 714 and the modified reconstructed chroma samples 722, 732, respectively.

Figure 8:
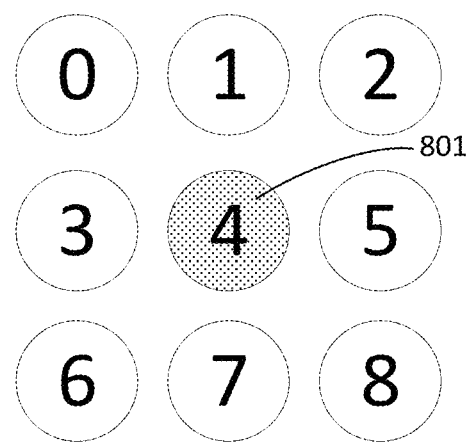
FIG. 8 illustrates nine candidate positions from which a co-located luma sample can be chosen, according to some embodiments of the present disclosure.

In CCSAO, the co-located luma sample is used to classify the current chroma sample. FIG. 8 illustrates 9 candidate positions from which a co-located luma sample can be chosen, according to some embodiments of the present disclosure. As shown in FIG. 8, in a picture, the top-left sample of a picture is at (0, 0), if the current chroma sample is at (i, j), the co-located luma sample is at (2i, 2j), that is the circle in shadow (e.g., 801). A position index (e.g., 4) is signaled in PH to indicate which co-located luma sample is selected.

The band offset (BO) is used to perform classification for CCSAO. Specifically, the range of the reconstructed value associated with a co-located luma sample is equally divided into $N_L$ bands. The value of $N_L$ is allowed to change from 1 to 16 and signaled in PH. For each category, one offset is signaled and added to all the reconstructed chroma samples that fall into the category, according to the following equations:

$$\text{idx} = (Y_{rec}^{dbf} * N_L) \gg \text{bitdepth} \qquad \text{Eq. (3)}$$

$$C'_{rec} = C_{rec} + \text{offset[idx]} \qquad \text{Eq. (4)}$$

In Eq. (3), $y_{rec}^{dbf}$ is the reconstructed value associated with the co-located luma sample that is used to classify the current chroma sample, bitdepth is the internal coding bit depth and idx is the category index of the current chroma sample. In Eq. (4), $C_{rec}$ and $C'_{rec}$ are the reconstructed values associated with the chroma sample before and after CCSAO, and offset [idx] is the value of CCSAO offset that is applied to idx-th category.

In AVS3, the CCSAO offsets are constrained to be within the range [−15, 15] and are signaled separately in PH with truncated unary code. Additionally, a control flag is firstly signaled in PH to indicate whether CCSAO is enabled to the current picture or not. If the flag is on (i.e., the CCSAO is enabled to the current picture), a second control flag is further signaled to indicate whether to enable CTU on/off control granularity. The CTUs in the current picture can only be enabled/disabled independently when the second flag is on (i.e., the CTU on control is enabled). If the second flag is off (i.e., the CTU off control is enabled), CCSAO is applied to all CTUs according to the first flag.

Figures 9A, 9B:
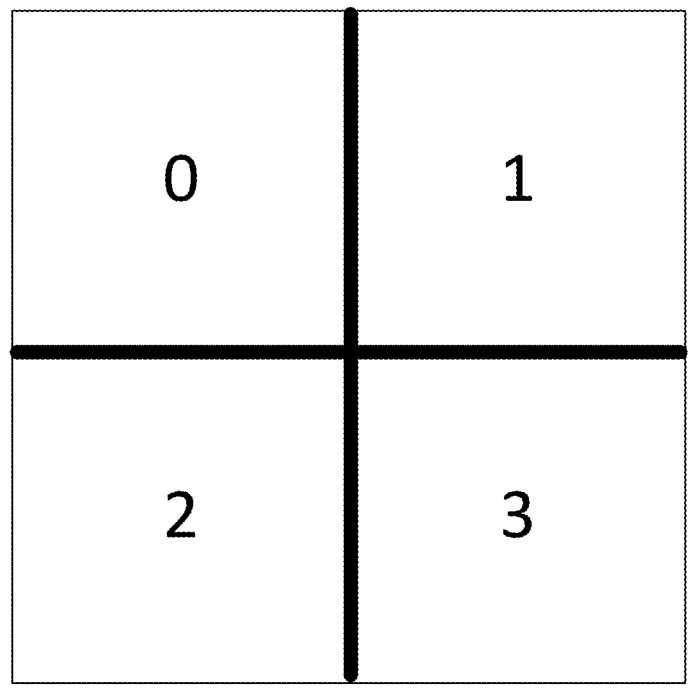
FIG. 9A illustrates a split method of CCSAO-QUA, according to some embodiments of the present disclosure.
FIG. 9B illustrates another split method of CCSAO-QUA, according to some embodiments of the present disclosure.

Two improvement methods for CCSAO quadtree (CCSAO-QUA) can be used to further improve the chroma coding efficiency. FIGS. 9A and 9B illustrate two split methods of CCSAO-QUA respectively, according to some embodiments of the present disclosure.

As shown in FIG. 9A, the first method divides a frame into four regions according to the quadtree. A flag is signaled to indicate whether to split the frame or not and each region can signal different CCSAO parameters (including whether CCSAO is enabled to the current region, whether to enable CTU on/off control, the position of the co-located luma sample, $N_L$ and the offset values of each category). As shown in FIG. 9B, the second method divides a frame into up to 16 regions according to two recursive quadtrees. A flag is signaled to indicate whether to split the frame or not; and if the flag is on, another 4 flags are signaled to indicate whether to further split or not, and each region can signal different CCSAO parameters.

Moreover, multiple classifiers of CCSAO can be signaled in a frame to further improve the chroma coding efficiency, according to some embodiments of the present disclosure. In some embodiments, the number of the classifiers of CCSAO in a frame is extended to up to 4. When the CCSAO CTU on/off control flag at frame level is enabled, the number of the classifiers used in this frame is firstly signaled, followed by the parameters for each classifier (including the position of the co-located luma sample, the number of brands $N_L$ and the offset values of each category). To reduce decoder complexity and give encoder more flexibility, which classifier to be used is explicitly signaled and switched in the CTU level. A truncated unary coded index is further signaled to indicate the selected classifier if CCSAO is applied for a CTU.

In some embodiments, a new classification method is proposed for CCSAO. A flag is signaled to indicate whether to use the original CCSAO classification method or a new CCSAO classification method. With the new classification method, a combination of BO and EO can be used.

For BO in the new classification method, either the current reconstructed chroma sample at (i, j) (after deblocking filtering) or the co-located reconstructed luma sample at (2i, 2j) (after deblocking filtering) can be used. The whole sample value range is equally divided into $N_{BO}$ categories. If co-located reconstructed luma samples are used, the BO category index can be obtained according to Eq. (5); if reconstructed chroma samples are used, the BO category index can be obtained according to Eq. (6).

$$\text{idx\_BO} = (Y_{rec}^{dbf} * N_{BO}) \gg \text{bitdepth} \qquad \text{Eq. (5)}$$

$$\text{idx\_BO} = (C_{rec}^{dbf} * N_{BO}) \gg \qquad \text{Eq. (6)}$$

wherein idx_BO is the BO category index for the current chroma sample. The value of $N_{BO}$ can be 1 or 2 in Eq. (5) or Eq. (6) respectively. For example, if the value of $N_{BO}$ is equal to 1 in Eq. (5), the value of $N_{BO}$ can be changed from 1 to 2 in Eq. (6). If the value of $N_{BO}$ is equal to 2 in Eq. (5), the value of $N_{BO}$ can be changed from 2 to 1 in Eq. (6). Whether the co-located reconstructed luma samples or co-located chroma reconstructed samples being used in BO is signaled for each CTU.

For EO in the new classification method, the co-located reconstructed luma sample at (2i, 2j) (after deblocking filtering) is used. The 4 EO patterns shown in FIG. 5 can be used. For a certain pattern, the following method is used to derive the classification result of EO, where TH is a threshold within the range of {2, 4, 6, 10, 12, 14, 16} and is signaled in the PH, idx_EO is the EO category index for the current chroma sample, which can be obtained according to Eq. (7)-Eq. (9).

$$\text{idx\_EO1}=(b-a<00)?(b-a<-TH?0:1):(b-a<TH?2:3) \quad \text{Eq. (7)}$$

$$\text{idx\_EO2}=(b-c<00)?(b-c<-TH?0:1):(b-c<TH?2:3) \quad \text{Eq. (8)}$$

$$\text{idx\_EO}=\text{idx\_EO}*4+\text{idx\_EO2} \quad \text{Eq. (9)}$$

where idx_EO1 and idx_EO2 are two intermediate results. idx_EO is the EO category index for the current chroma sample.

The final classification result can be obtained by combining idx_BO and idx_EO according to the following equation:

$$\text{idx}=\text{idx\_BO}*16+\text{idx\_EO} \quad \text{Eq. (10)}$$

where idx is the category index of the current chroma sample.

The following problem is observed in the current CCSAO design in AVS3.

Figure 10:
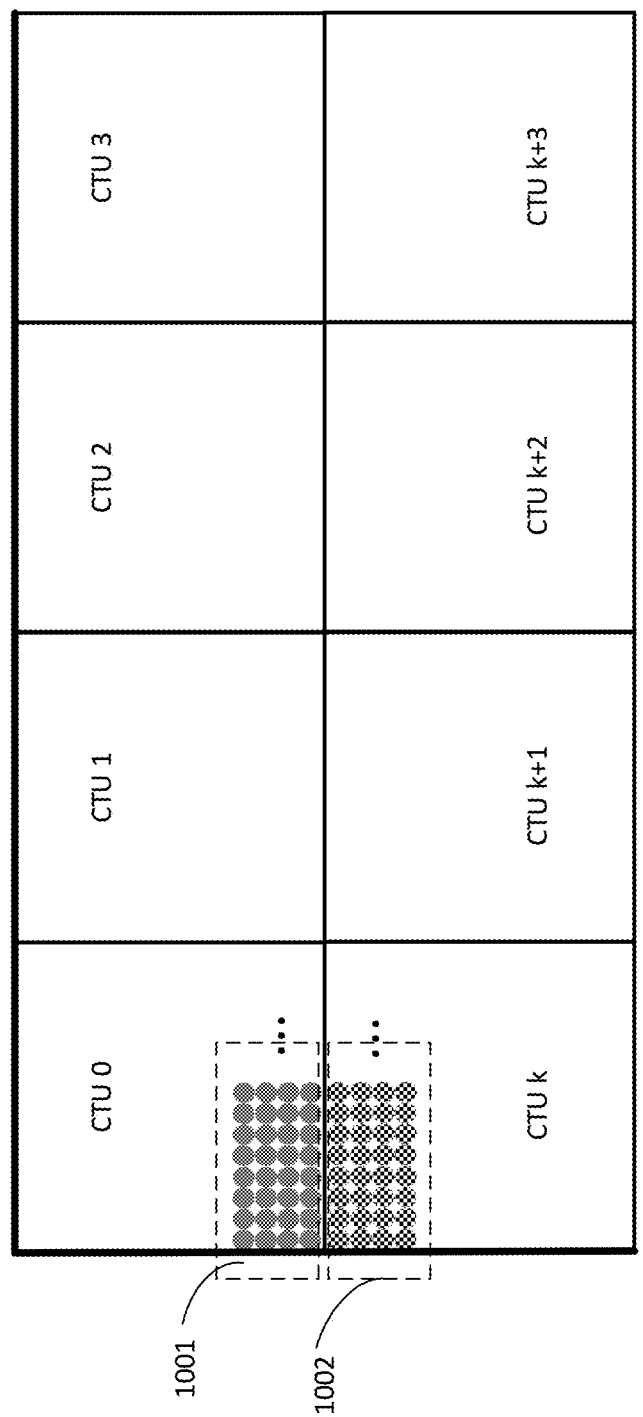
FIG. 10 illustrates samples involved in coding tree unit (CTU) bottom boundary deblocking filter, according to some embodiments of the present disclosure.

In AVS3, SAO, ESAO and CCSAO are performed after the deblocking filter. The deblocking filter is used to filter boundaries of the blocks to reduce block artifacts in the reconstructed picture introduced by a compression. The boundaries to be deblock filtered include boundaries of coding unit, boundaries of prediction unit, and boundaries of transform unit. For each CTU, after the reconstruction, the bottom boundary that cannot be deblock filtered as samples of the bottom neighboring CTU are not decoded or encoded. FIG. 10 illustrates samples involved in CTU bottom boundary deblocking filter, according to some embodiments of the present disclosure. Referring to FIG. 10, because the coding order is one CTU by one CTU in raster-scan order, the bottom samples 1001 of CTU 0 cannot be deblock filtered, when CTU 0 is reconstructed as the top samples 1002 of CTU k. Therefore, the bottom samples 1001 are needed in the filtering while the top samples of CTU k have not been encoded or decoded yet. So the bottom reconstructed samples 1001 of CTU 0 are needed to be stored and filtered after CTU k is reconstructed. The situation is the same for the bottom samples of CTU 1, CTU 2 and other CTUs in the same CTU line. In hardware implementation, all the bottom samples of a CTU line are stored in a line buffer. The line buffer can be expensive when a picture width is very large. Since the deblock filtering of bottom samples of each CTU is performed after reconstruction of the bottom neighboring CTU, the SAO, ESAO, CCSAO, and ALF should also be pending until the bottom neighboring CTU is reconstructed.

In AVS3, for luma deblocking, four luma samples on each side of a boundary are used as an input of the filter and only three luma samples on each side of a boundary are filtered. Since four luma samples are used on each side, four lines of luma reconstructed samples are stored in line buffer. For chroma deblocking, three chroma samples on each side of a boundary are used as an input of the filter, and only two chroma samples on each side of a boundary are filtered. Since three chroma samples are used on each side, three lines of chroma reconstructed samples are stored in line buffer.

Figure 11:
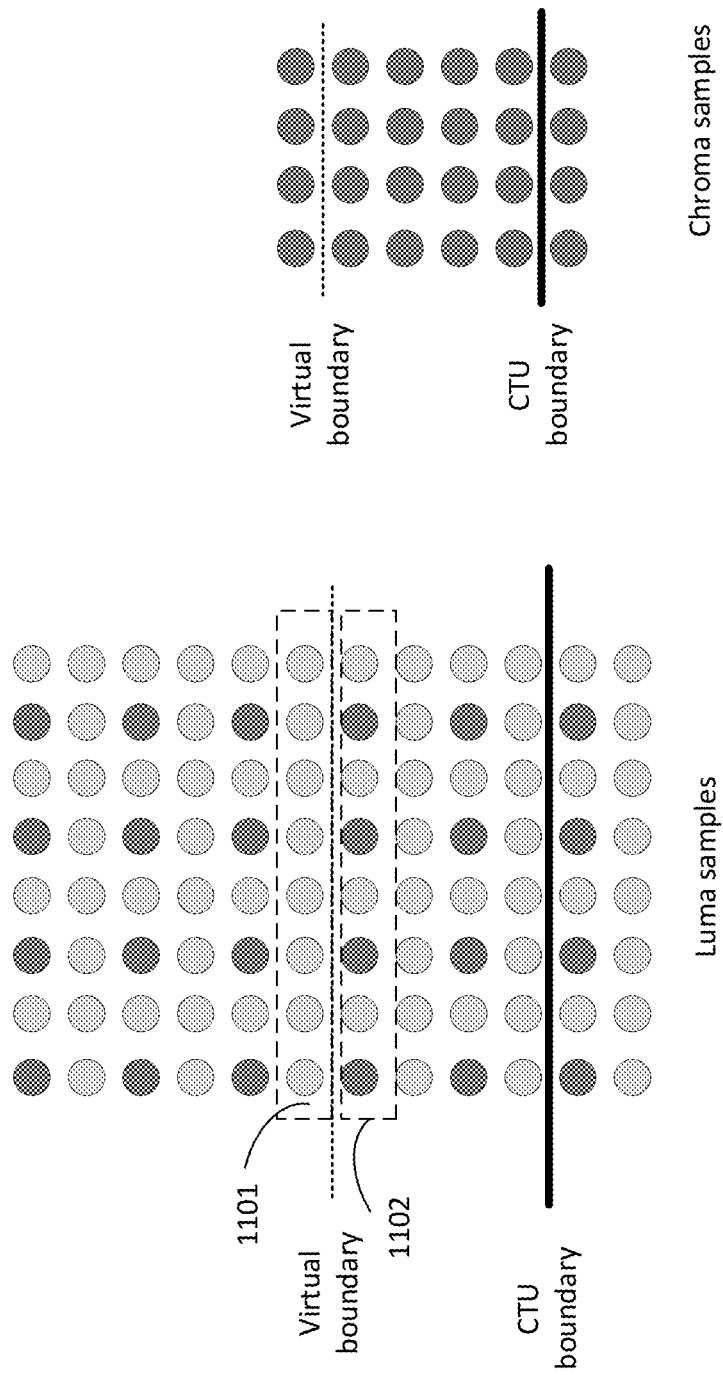
FIG. 11 illustrates an exemplary virtual boundary for adaptive loop filter (ALF) for luma samples and chroma samples respectively, according to some embodiment of the present disclosure.

For ALF, the samples stored in the line buffer (4 luma lines above the bottom boundary of a CTU) are filtered by ALF after a bottom neighboring CTU is reconstructed. Since the samples above the 4th line above the bottom boundary of a CTU are not stored in the line buffer, the samples above the 4th line above the bottom boundary of the CTU cannot be used. FIG. 11 illustrates an exemplary virtual boundary for ALF for luma samples, according to some embodiment of the present disclosure. Referring to FIG. 11, a virtual boundary is illustrated between the 4th line 1102 and 5th line 1101 above a horizontal boundary (e.g., bottom boundary) of a CTU. In the ALF process, when a current sample is filtered, the neighboring samples on the other side of a virtual boundary cannot be used and only the neighboring samples on the same side of a virtual boundary can be used. The virtual boundary is set between the 4th line 1102 and 5th line 1101 above a horizontal boundary of a CTU for both luma component and chroma component in AVS3. In some embodiments, the chroma samples on the 4th line above a horizontal boundary of a CTU also need to be stored in a line buffer and filtered after the bottom neighboring CTU is reconstructed. Therefore, in some embodiments, 4 lines of chroma samples are stored in a line buffer.

Figure 12A:
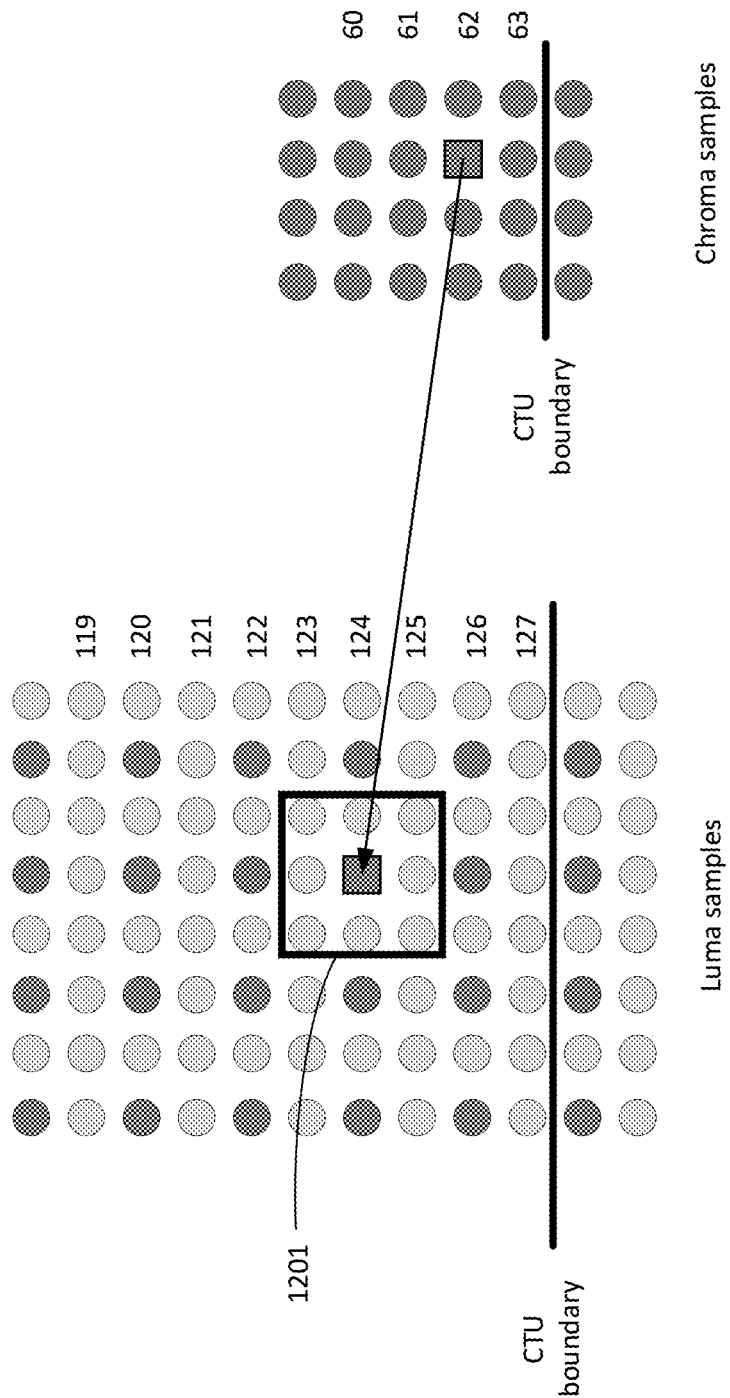
FIG. 12A-12C illustrate co-located luma samples used for chroma in CCSAO of respective different examples, according to some embodiments of the present disclosure.
Figure 12B:
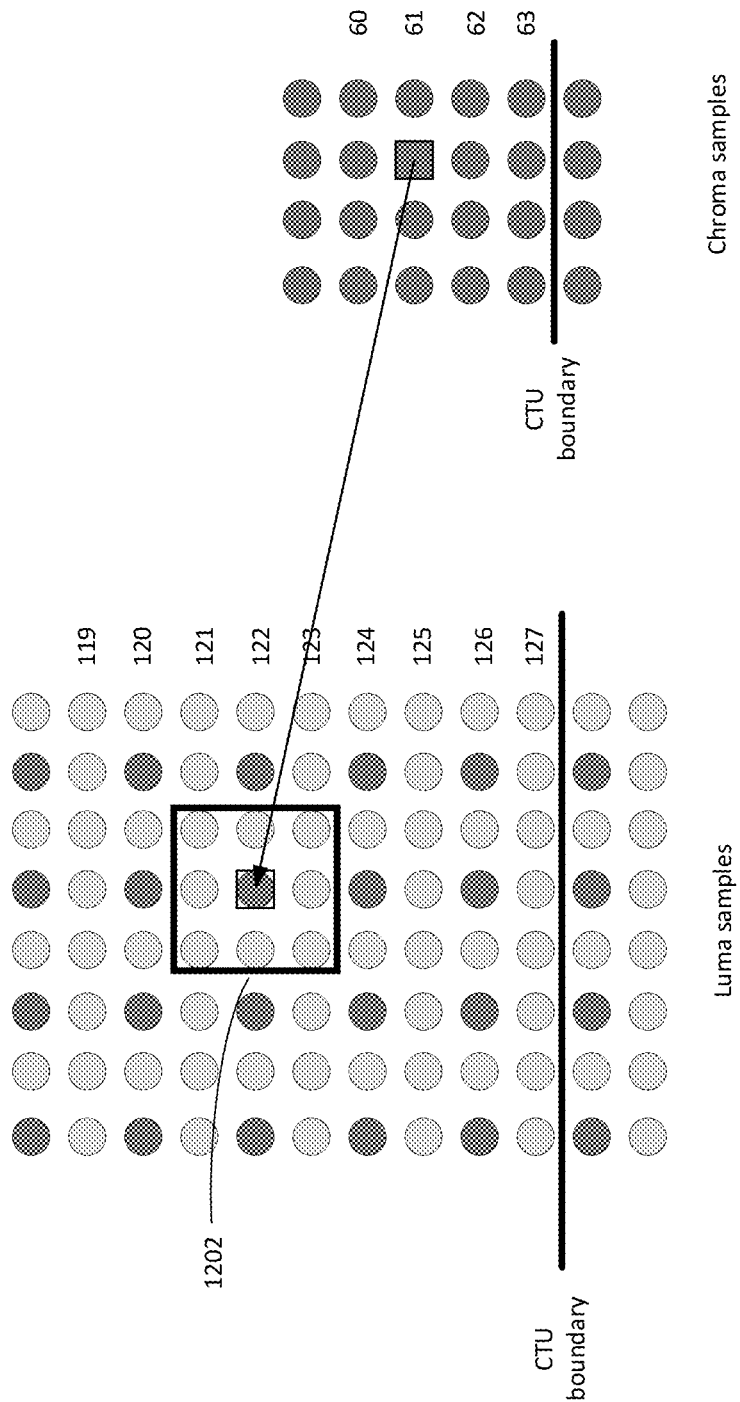
Figure 12C:
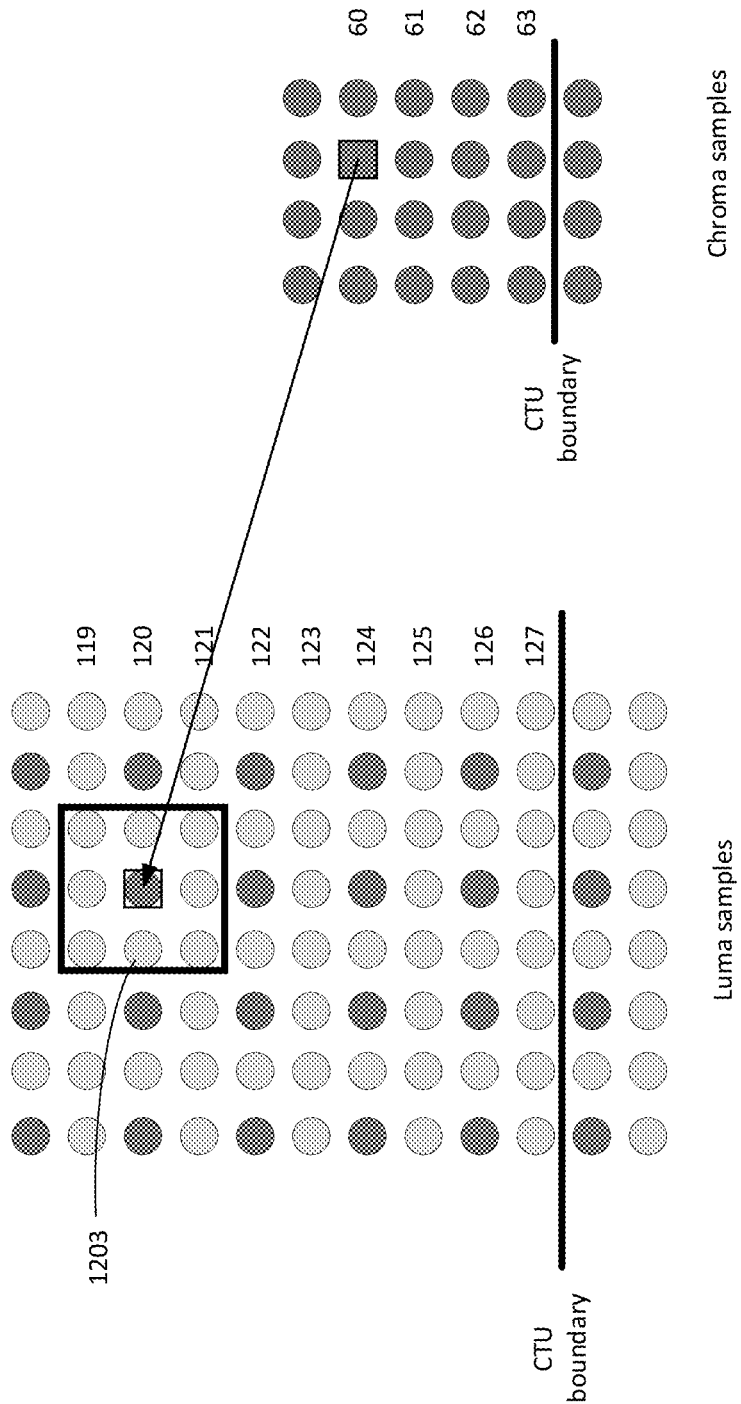

However, in CCSAO, the co-located luma sample can be selected from 9 candidate positions. To apply CCSAO on the chroma samples stored in the line buffer (i.e., 3 lines or 4 lines of chroma samples above a horizontal CTU boundary), more luma samples are required than those stored in the line buffer (i.e., 4 lines of luma samples above a horizontal CTU boundary). The horizontal CTU boundary can be the bottom boundary of a CTU. FIGS. 12A-12C illustrate co-located luma samples used for chroma in CCSAO of respective different examples, according to some embodiments of the present disclosure. For example, as shown in FIG. 12A, for the chroma samples in the 2nd line above a horizontal CTU boundary (indicated as line 62), the 9 luma samples within block 1201 are needed (indicated samples in line 123,124 and 125), which means 5 lines of luma samples (from line 127 to line 123) are required. As shown in FIG. 12B, for the chroma samples on the 3rd line above a horizontal CTU boundary (indicated as line 61), the 9 luma samples within block 1202 are needed (indicated by line 121,122, and 123), which means 7 lines of luma samples (from line 127 to line 121) are required. As shown in FIG. 12C, for the chroma samples on the 4th line above a horizontal CTU boundary (indicated as line 60), the 9 luma samples within block 1203 are needed (indicated samples in line 119,120 and 121), which means 9 lines of luma samples (from line 127 to line 119) are required. Therefore, the line buffer has to be increased due to a co-located luma sample position of a chroma sample for BO and neighboring luma sample position for EO in CCSAO.

The present disclosure provides methods and systems for solving the above problems. It is contemplated that the disclosed methods and systems can also solve other problems not explicitly noted in the disclosure, and are not limited to solving the above problem.

Consistent with the disclosed embodiments, the following methods can be used to reduce or avoid increasing the amount of a line buffer.

In some embodiments, if a co-located luma sample used for a chroma sample in BO of CCSAO or a neighboring luma sample used for a chroma sample in EO of CCSAO is not stored in the line buffer while the chroma sample is stored in the line buffer, the co-located luma sample is replaced with the nearest luma sample stored in the line buffer. That is, if a co-located luma sample used or a neighboring luma sample used is above the 4th line above a horizontal CTU boundary while the chroma sample is below the 4th line above a horizontal CTU boundary, just a luma sample on the 4th line above a horizontal CTU boundary and in a same column is used instead.

Figure 13A:
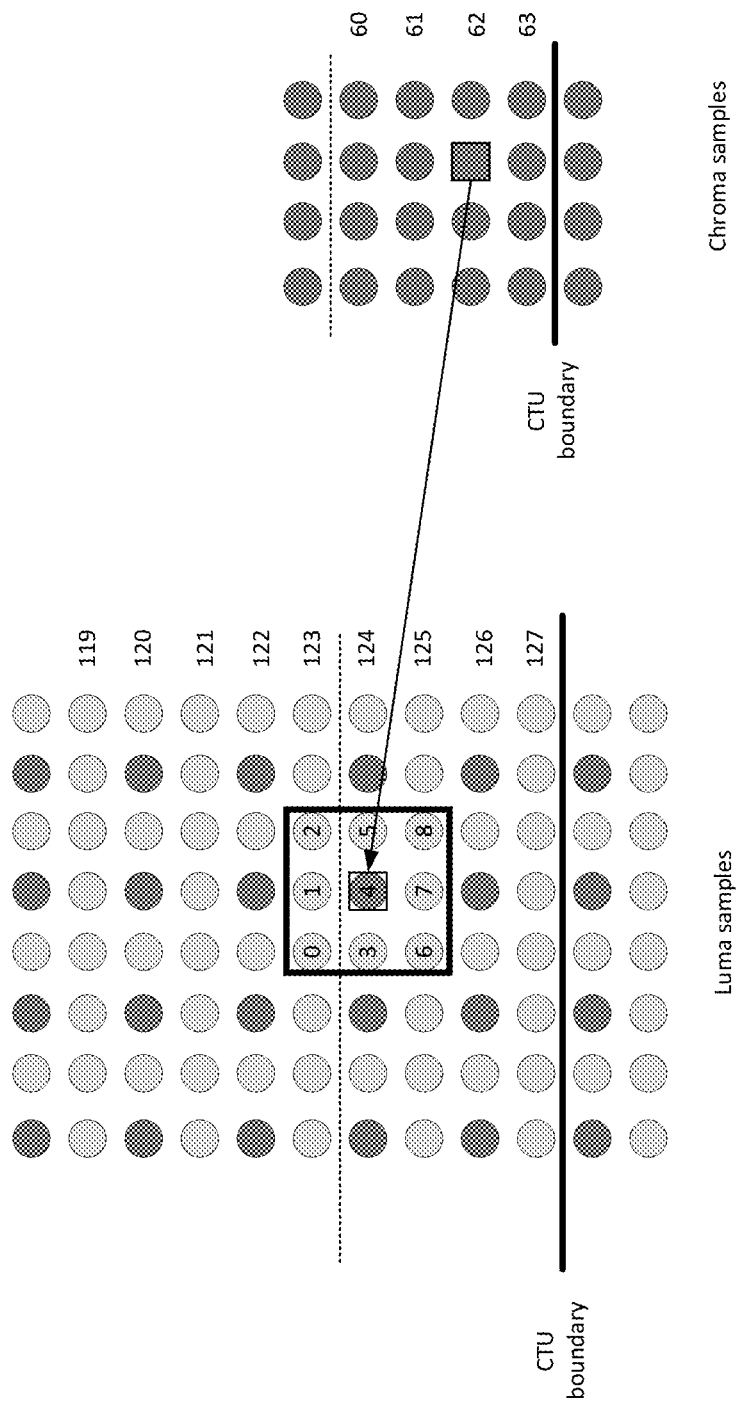
FIGS. 13A-13C illustrate luma samples used for CCSAO on chroma of respective different examples, according to some embodiments of the present disclosure.
Figure 13B:
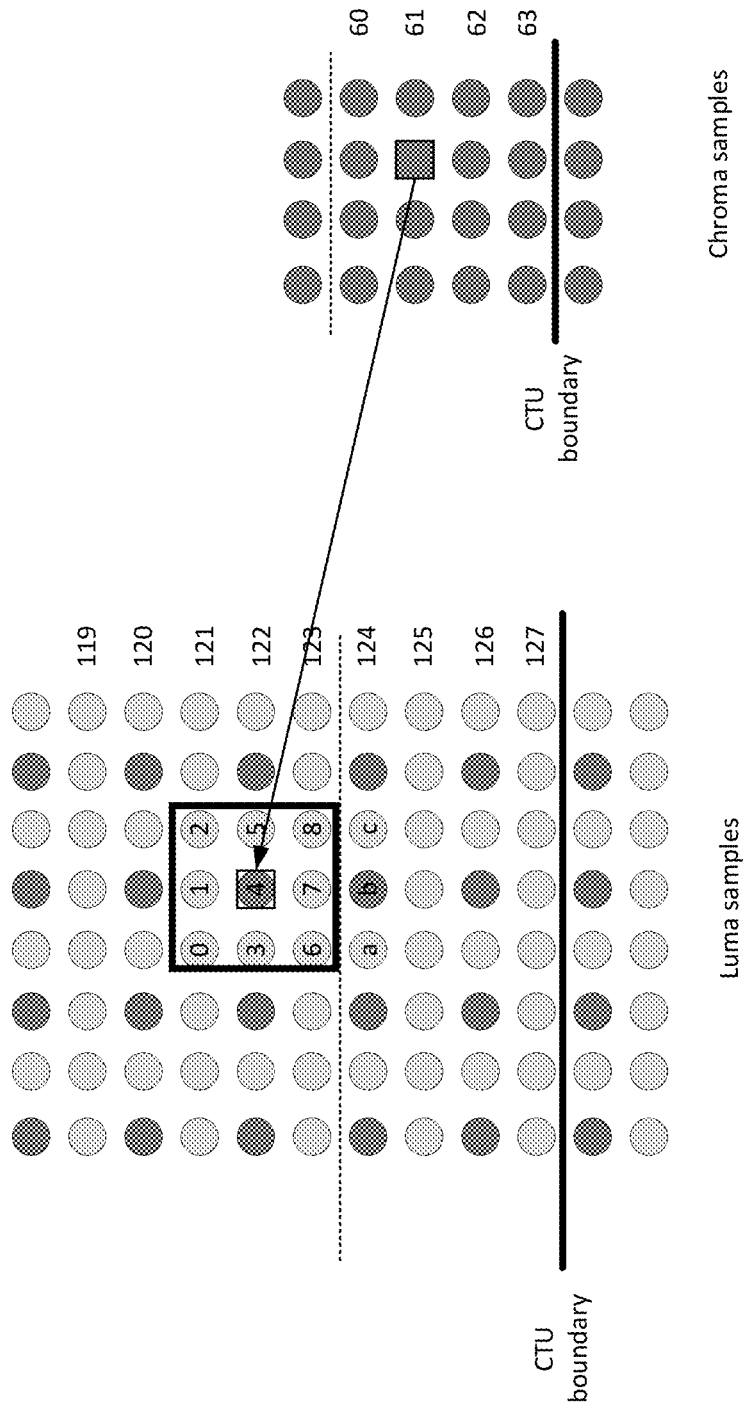
Figure 13C:
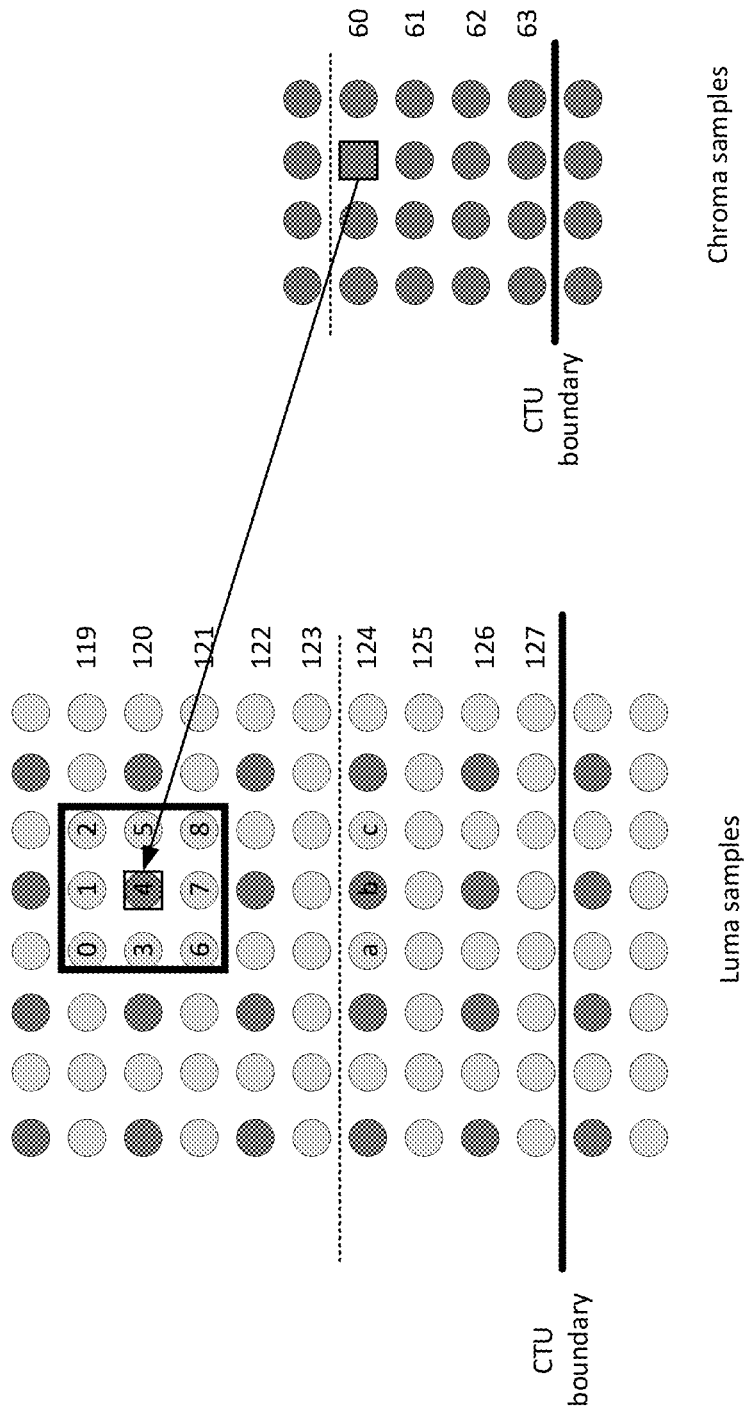

FIGS. 13A-13C illustrate luma samples used for CCSAO on chroma of respective different examples, according to some embodiments of the present disclosure. For example, in some embodiments, as shown in FIG. 13A, for a chroma sample on a 2nd line above a horizontal CTU boundary (line 62), the co-located luma samples used in BO can be luma sample 0 to luma sample 8 (on line 123 to 125) and the neighboring luma sample used for EO can be luma samples 0, 1, 2, 3, 5, 6, 7, and 8 (on line 123 to 125). Among these luma samples, luma samples 0, 1, and 2 are above the 4th line above the horizontal CTU boundary which are not stored in line buffer. If luma sample 0 is indicated to be used as co-located luma sample or neighboring luma sample, luma sample 3 is used instead. That is, if the index signaled in bitstream indicates luma sample 0 or luma sample 3 is used for co-located luma sample or neighboring luma sample, then luma sample 3 is always used. If luma sample 1 is indicated to be used as co-located luma sample or neighboring luma sample, luma sample 4 is used instead. That is, if the index signaled in bitstream indicates luma sample 1 or luma sample 4 is used for co-located luma sample or neighboring luma sample, then luma sample 4 is always used. If luma sample 2 is indicated to be used as co-located luma sample or neighboring luma sample, luma sample 5 is used instead. That is, if the index signaled in bitstream indicates luma sample 2 or luma sample 5 is used for co-located luma sample or neighboring luma sample, then luma sample 5 is always used. It can be also understood as luma sample 3 is padded to luma sample 0, luma sample 4 is padded to luma sample 1, and luma sample 5 is padded to luma sample 2 in CCSAO. Alternatively, it can be understood as the position of luma sample 0 is clipped to the position of luma sample 3, the position of luma sample 1 is clipped to the position of luma sample 4, and the position of luma sample 2 is clipped to the position of luma sample 5.

In some embodiments, as shown in FIG. 13B, for a chroma sample on a 3rd line above a horizontal CTU boundary (line 61), the co-located luma samples used in BO can be luma sample 0 to luma sample 8 (on line 121 to 123) and the neighboring luma sample used for EO can be luma sample 0, 1, 2, 3, 5, 6, 7, and 8 (on line 121 to 123). All of these samples are above the 4th line above the horizontal CTU boundary and thus are not stored in line buffer. If luma sample 0, 3, or 6 is indicated to be used as co-located luma sample or neighboring luma sample, luma sample a is used instead. That is, if the index signaled in bitstream indicates luma sample 0, luma sample 3, or luma sample 6 is used for co-located luma sample or neighboring luma sample, then luma sample a is always used. If luma sample 1, 4, or 7 is indicated to be used as co-located luma sample or neighboring luma sample, luma sample b is used instead. That is, if the index signaled in bitstream indicates luma sample 1, luma sample 4, or luma sample 7 is used for co-located luma sample or neighboring luma sample, then luma sample b is always used. If luma sample 2, 5, or 8 is indicated to be used as co-located luma sample or neighboring luma sample, luma sample c will be used instead. That is, if the index signaled in bitstream indicates luma sample 2, luma sample 5, or luma sample 8 is used for co-located luma sample or neighboring luma sample, then luma sample c is always used. It can be understood as luma sample a is padded to luma sample 0, 3, and 6, luma sample b is padded to luma sample 1, 4, and 7, and luma sample c is padded to luma sample 2, 5, and 8 in CCSAO. Alternatively, it can be understood as the positions of luma sample 0, 3, and 6 are clipped to a position of luma sample a, positions of luma sample 1, 4, and 7 are clipped to a position of luma sample b, and the positions of luma sample 2, 5, and 8 are clipped to a position of luma sample c.

For example, in some embodiments, as shown in FIG. 13C, for a chroma sample on the 4th line above a horizontal CTU boundary (line 60), the co-located luma samples used in BO can be luma sample 0 to luma sample 8 (on line 119 to 121) and the neighboring luma sample used for EO can be luma sample 0, 1, 2, 3, 5, 6, 7, and 8 (on line 119 to 121). All of these samples are above the 4th line above the horizontal CTU boundary and thus are not stored in line buffer. If luma sample 0, 3, or 6 is indicated to be used as co-located luma sample or neighboring luma sample, luma sample a is used instead. That is, if the index signaled in bitstream indicates luma sample 0, luma sample 3, or luma sample 6 is used for co-located luma sample or neighboring luma sample, then luma sample a is always used. If luma sample 1, 4, or 7 is indicated to be used as co-located luma sample or neighboring luma sample, luma sample b is used instead. That is, if the index signaled in bitstream indicates luma sample 1, luma sample 4, or luma sample 7 is used for co-located luma sample or neighboring luma sample, then luma sample b is always used. If luma sample 2, 5, or 8 is indicated to be used as co-located luma sample or neighboring luma sample, luma sample c will be used instead. That is, if the index signaled in bitstream indicates luma sample 2, luma sample 5, or luma sample 8 is used for co-located luma sample or neighboring luma sample, then luma sample c is always used. It can be understood as luma sample a is padded to luma samples 0, 3, and 6, luma sample b is padded to luma samples 1, 4, and 7, and luma sample c is padded to luma samples 2, 5, and 8 in CCSAO. Alternatively, it can be understood as the position of luma samples 0, 3, and 6 are clipped to a position of luma sample a, positions of luma sample 1, 4, and 7 are clipped to a position of luma sample b, and positions of luma sample 2, 5, and 8 are clipped to a position of luma sample c.

Figure 14:
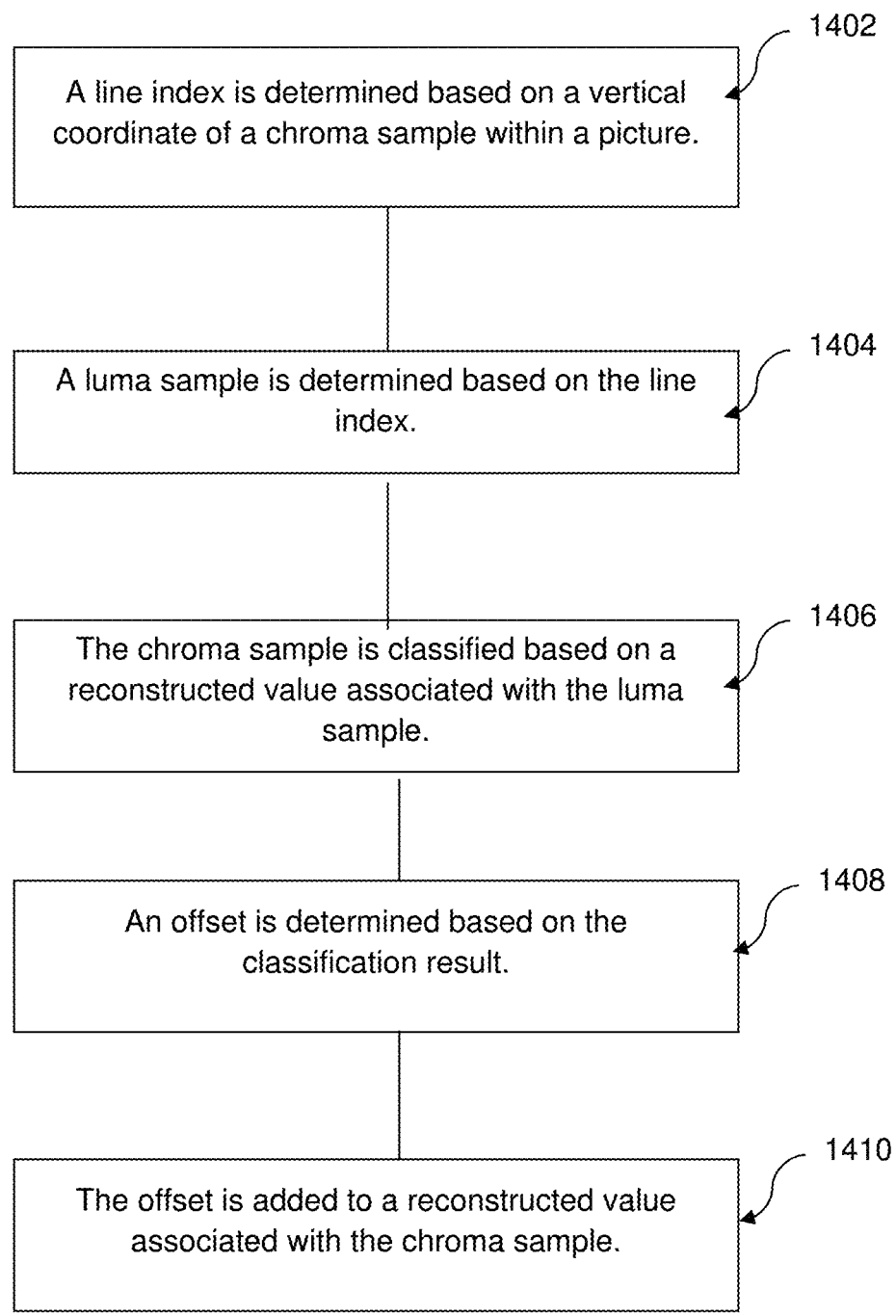
FIG. 14 illustrates a flow chart of a method for cross-component sample adaptive offset (CCSAO), according to some embodiments of the present disclosure.

FIG. 14 illustrates a flow chart of a method 1400 for cross-component sample adaptive offset (CCSAO), according to some embodiments of the present disclosure. Method 1400 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1400. In some embodiments, method 1400 can be implemented by a computer program product, embodied in a computer-readable medium, including computer-executable instructions, such as program code, executed by computers (e.g., apparatus 400 of FIG. 4). Referring to FIG. 14, method 1400 may include the following steps 1402-1410.

At step 1402, a line index is determined based on a vertical position of a chroma sample within a picture. The line index of the current chroma sample is used to indicate whether one or more of the co-located luma samples used for the chroma sample in BO of CCSAO or neighboring luma samples used for the chroma sample in EO of CCSAO is not stored in the line buffer (e.g., one or more of the co-located luma samples is located above the four lines samples above a horizontal CTU boundary), while the chroma sample is stored in the line buffer (e.g., the chroma sample is located within the 4 line samples above a horizontal CTU boundary). In some embodiments, the line index being greater than 0 indicates that one or more of the co-located luma samples used for the chroma sample in BO of CCSAO or neighboring luma samples used for the chroma sample in EO of CCSAO is not stored in the line buffer, while the chroma sample is stored in the line buffer. The line index being equal to 0 indicates that all the co-located luma samples used for the chroma sample in BO of CCSAO or neighboring luma samples used for the chroma sample in EO of CCSAO are stored in the line buffer while the chroma sample is also stored in the line buffer, or all the co-located luma samples used for the chroma sample in BO of CCSAO or neighboring luma samples used for the chroma sample in EO of CCSAO are not stored in the line buffer while the chroma sample is also not stored in the line buffer.

At step 1404, a luma sample is determined based on the line index. In some embodiments, the luma sample is determined based on a horizontal position and a vertical position of the luma sample. In some embodiments, the horizontal position and the vertical position of the luma sample are determined based on the line index. In some embodiments, only the vertical position of the luma sample is determined based on the line index to ensure that both the luma sample and the chroma sample are stored in the line buffer or neither is stored in the line buffer.

In some embodiments, a first vertical position among three values associated with the vertical position of the chroma sample is determined. For example, in BO classification method, three values correspond to three vertical positions in FIG. 8. In EO classification method, three values correspond to three vertical positions in FIG. 5. In some embodiments, the classification method is indicated by a flag. The flag can be signaled in CTU level. For example, when the value of the flag being to 1, a BO classification method is used. When the value of the flag being to 2, a combination of BO and EO classification method is used. Assuming that the coordinate of the luma sample in the top left corner of the current picture is (0, 0), in response to the line index being greater than 0 and the first vertical position is greater than a second vertical position of the fourth line above the horizontal CTU boundary, the vertical position of the luma sample is set to be the second vertical position. In this case, the first vertical position is out of the positions stored in the line buffer. A distance between the first vertical position and the horizontal CTU boundary is greater than a distance between the second vertical position and the horizontal CTU boundary. When the first vertical position is less than or equal to a second vertical position associated with the fourth line above the horizontal CTU boundary, the vertical coordinator position of the luma sample is set to be the first vertical position. In this case, the first vertical position is within the positions stored in the line buffer. The distance between the first vertical position and the horizontal CTU boundary is less than or equal to a distance between the second vertical position and the horizontal CTU boundary.

At step 1406, the chroma sample is classified based on a reconstructed value associated with the luma sample. In some embodiment, a BO classification method or a combination of BO and EO classification method is used.

At step 1408, an offset is determined based on the classification result. In some embodiments, the offset can be signaled separately for each category in PH.

At step 1410, the offset is added to a reconstructed value associated with the chroma sample. In some embodiments, the process to add the offset to a reconstructed value associated with the chroma sample can refer to FIG. 7.

In some embodiments, assuming that the coordinate of the chroma sample in the top left corner of the current picture is (0, 0), the coordinate of the current chroma sample is (xC, yC), where xC is the horizontal coordinate indicating the horizontal distance between the current chroma sample and the top left chroma sample, yC is the vertical coordinate indicating the vertical distance between the current chroma sample and the top left chroma sample. The line index can be derived by a vertical coordinate yC of the chroma sample:

$$\text{line index} = (yC\%HC) >= HC - n ? (HC - yC - 0) : 0 \qquad \text{Eq. (11)}$$

where HC is a height associated with a CTU, n is the number of the lines stored in the line buffer which is equal to 4 in AVS3. Then the line index being greater than 0 indicates that one or more of the co-located luma samples used for the chroma sample in BO of CCSAO or neighboring luma samples used for the current chroma sample in EO of CCSAO are not stored in the line buffer. For example, for a chroma sample on the 2nd line above a horizontal CTU boundary (line 62), the line index is equal to 1; for a chroma sample on the 3rd line above a horizontal CTU boundary (line 61), the line index is equal to 2; for a chroma sample on the 4th line above a horizontal CTU boundary (line 60), the line index is equal to 3; and for other chroma samples, the line index is equal to 0.

In some embodiments, the co-located luma sample used for a chroma sample in BO of CCSAO or the neighboring luma sample used for a chroma sample in EO of CCSAO is indicated by the coordinate of the current chroma sample (xC, yC) and two offsets as ((xC<<1)+offsetx, (yC<<1)+offsety). For example, for a chroma sample on the 1st line above a horizontal CTU boundary (e.g., line 63 as shown in FIGS. 13A-13C), the co-located luma samples 0, 1, 2, 3, 4, 5, 6, 7, and 8 can be represented by ((xC<<1)−1, (yC<<1)−1), ((xC<<1)+0, (yC<<1)−1), ((xC<<1)+1, (yC<<1)−1), ((xC<<1)−1, (yC<<1)+0), ((xC<<1)+0, (yC<<1)+0), ((xC<<1)+1, (yC<<1)+0), ((xC<<1)−1, (yC<<1)+1), ((xC<<1)+0, (yC<<1)+1), and ((xC<<1)+1, (yC<<1)+1), respectively. The replacement method mentioned above can be understood to modify the offsety according to the line index. Referring to FIG. 13A, for a chroma sample on the 2nd line above a horizontal CTU boundary (e.g. line 62), the line index is equal to 1, the luma samples 0, 1, 2, 3, 4, 5, 6, 7, and 8 can be luma samples located at ((xC<<1)−1, (yC<<1)+0), ((xC<<1)+0, (yC<<1)+0), ((xC<<1)+1, (yC<<1)+0), ((xC<<1)−1, (yC<<1)+0), ((xC<<1)+0, (yC<<1)+0), ((xC<<1)+1, (yC<<1)+0), ((xC<<1)−1, (yC<<1)+1), ((xC<<1)+0, (yC<<1)+1), and ((xC<<1)+1, (yC<<1)+1), respectively. Referring to FIG. 13B, for a chroma sample on the 3rd line above a horizontal CTU boundary (line 61), the line index is equal to 2, the luma samples 0, 1, 2, 3, 4, 5, 6, 7, and 8 can be luma samples located at ((xC<<1)−1, (yC<<1)+2), ((xC<<1)+0, (yC<<1)+2), ((xC<<1)+1, (yC<<1)+2), ((xC<<1)−1, (yC<<1)+2), ((xC<<1)+0, (yC<<1)+2), ((xC<<1)+1, (yC<<1)+2), ((xC<<1)−1, (yC<<1)+2), ((xC<<1)+0, (yC<<1)+2), and ((xC<<1)+1, (yC<<1)+2), respectively. Referring to FIG. 13C, for a chroma sample on the 4th line above a horizontal CTU boundary (line 60), the line index is equal to 3, the luma samples 0, 1, 2, 3, 4, 5, 6, 7, and 8 can be luma samples located at ((xC<<1)−1, (yC<<1)+4), ((xC<<1)+0, (yC<<1)+4), ((xC<<1)+1, (yC<<1)+4), ((xC<<1)−1, (yC<<1)+4), ((xC<<1)+0, (yC<<1)+4), ((xC<<1)+1, (yC<<1)+4), ((xC<<1)−1, (yC<<1)+4), ((xC<<1)+0, (yC<<1)+4), and ((xC<<1)+1, (yC<<1)+4), respectively. For other chroma samples, the line index is equal to 0, therefore, the position of the luma samples are not changed. The luma samples on the 4th line (line 124) can be used to replace the luma samples on the lines that above the four lines above a horizontal CTU boundary.

In some embodiments, if a co-located luma sample used for a chroma sample in BO of CCSAO or a neighboring luma sample used for a chroma sample in EO of CCSAO is not stored in the line buffer while the chroma sample is stored in the line buffer, the CCSAO operation on that chroma sample is skipped. In another word, CCSAO is not applied to a chroma sample if a luma sample that is not stored in line buffer (i.e., the luma sample is located above the 4 lines luma samples above a horizontal CTU boundary) while the chroma sample is stored in the line buffer (i.e., the chroma sample is located within the 4 lines chroma samples above a horizontal CTU boundary) is required. That is, the offset to a reconstructed value associated with the chroma sample is equal to 0. In these embodiments, whether applying CCSAO on a current chroma sample or not depends on the corresponding luma sample. The corresponding luma sample is specified by a syntax element signaled in the CTU level and the position of the current chroma sample. In some embodiments, whether applying CCSAO on a current chrome sample or not depends on the line index of the current chroma sample. When the line index being equal to 0, the CCSAO is applied on the current chrome sample, and an offset is determined based on a classification result. When the line index being greater than 0, the offset is set to be 0, therefore, there is no CCSAO applied on the current chrome sample.

For example, as shown in FIG. 13A, for a current chroma sample on the 2nd line above a horizontal CTU boundary (line 62), the co-located luma samples used in BO can be luma sample 0 to luma sample 8 (on line 123 to 125), and the neighboring luma sample used for EO can be luma sample 0, 1, 2, 3, 5, 6, 7, or 8 (on line 123 to 125). Among these luma samples, luma sample 0, 1, and 2 are above the 4th line above the horizontal CTU boundary, which are not stored in line buffer. If luma sample 0, 1 or 2 is indicated to be used as co-located luma sample or neighboring luma sample, CCSAO operation on the current chroma sample is not applied. That is, when the index signaled in bitstream indicates luma sample 0, luma sample 1, or luma sample 2 is used as co-located luma sample or neighboring luma sample, no CCSAO is applied on the current chroma sample.

For example, as shown in FIG. 13B, for a current chroma sample on the 3rd line above a horizontal CTU boundary (line 61), the co-located luma samples used in BO can be luma sample 0 to luma sample 8 (on line 121 to 123) and the neighboring luma sample used for EO can be luma sample 0, 1, 2, 3, 5, 6, 7, or 8 (on line 121 to 123). All of these samples are above the 4th line above the horizontal CTU boundary and thus are not stored in line buffer. Thus, the CCSAO operation on the current chroma sample is always skipped. That is, CCSAO is disabled for chroma samples on the 3rd line above a horizontal CTU boundary.

For example, as shown in FIG. 13C, for a current chroma sample on the 4th line above a horizontal CTU boundary (line 60), the co-located luma samples used in BO can be luma sample 0 to luma sample 8 (on line 119 to 121) and the neighboring luma sample used for EO can be luma sample 0, 1, 2, 3, 5, 6, 7, or 8 (on line 119 to 121). All of these samples are above the 4th line above the horizontal CTU boundary, which are not stored in line buffer. Thus, the CCSAO operation on the current chroma sample is always skipped. That is, CCSAO is disabled for chroma samples on the 4th line above a horizontal CTU boundary.

The embodiments may further be described using the following clauses:

1. A video data processing method for cross-component sample adaptive offset, comprising:
determining an index based on a vertical coordinate of a chroma sample within a picture;
determining a luma sample based on the index;
classifying the chroma sample based on a reconstructed value associated with the luma sample;
determining an offset based on the classification; and
adding the offset to a reconstructed value associated with the chroma sample.

2. The method according to clause 1, wherein the index is obtained by:

$$\text{index}=(y\%H)>=H-n?(H-y-1):0$$

wherein y is the vertical coordinate of the chroma sample within the picture, H is a height associated with a coding tree unit, the n is a positive integer.

3. The method according to clause 2, wherein the n is equal to 4.

4. The method of any one of clauses 1 to 3, wherein in determining the luma sample based on the index, the method further comprises:
determining a horizontal coordinate of the luma sample based on a horizontal coordinate of the chroma sample and a classification method to be used;
determining a vertical coordinate of the luma sample based on the vertical coordinate of the chroma sample, the classification method to be used, and the index; and
determining the luma sample based on the horizontal coordinate of the luma sample and the vertical coordinate of the luma sample.

5. The method of clause 4, wherein in determining the vertical coordinate of the luma sample, the method further comprises:
determining a first vertical coordinate among three values associated with the vertical coordinate of the chroma sample based on the classification method to be used;
determining the vertical coordinate of the luma sample based on the first vertical coordinate and the index, wherein
in response to the index being equal to 0, the vertical coordinate of the luma sample is set to be the first vertical coordinate; and
in response to the index being greater than 0, a second vertical coordinate associated with a fourth line above a horizontal coding tree unit (CTU) boundary is determined,
when a distance between the first vertical coordinate and the horizontal CTU boundary is less than or equal to a distance between the second vertical coordinate and the horizontal CTU boundary, the vertical coordinate of the luma sample is set to be the first vertical coordinate, or
when the distance between the first vertical coordinate and the horizontal CTU boundary is greater than the distance between the second vertical coordinate and the horizontal CTU boundary, the vertical coordinate of the luma sample is set to be the second vertical coordinate.

6. The method of clause 4 or 5, wherein the classification method to be used is indicated by a flag.

7. The method of clause 1, wherein in determining an offset based on the classification, the method further comprises:
determining the offset based on the index, wherein in response to the index being equal to 0, the offset is determined based on the classification; and in response to the index being greater than 0, the offset is set equal to 0.

8. An apparatus for performing video data processing, the apparatus comprising:
a memory figured to store instructions; and
one or more processors configured to execute the instructions to cause the apparatus to perform:
determining an index based on a vertical coordinate of a chroma sample within a picture;
determining a luma sample based on the index;
classifying the chroma sample based on a reconstructed value associated with the luma sample;
determining an offset based on the classification; and
adding the offset to a reconstructed value associated with the chroma sample.

9. The apparatus of clause 8, wherein the index is obtained by:

$$\text{index}=(y\%H)>=H-n?(H-y-1):0$$

wherein y is the vertical coordinate of the chroma sample within the picture, H is a height associated with a coding tree unit, the n is a positive integer.

10. The apparatus of clause 9, wherein the n is equal to 4.

11. The apparatus of any one of clauses 8 to 10, wherein in determining the luma sample based on the index, the one or more processors are further configured to execute the instructions to cause the apparatus to perform:
determining a horizontal coordinate of the luma sample based on a horizontal coordinate of the chroma sample and a classification method to be used;
determining a vertical coordinate of the luma sample based on the vertical coordinate of the chroma sample, the classification method to be used, and the index; and
determining the luma sample based on the horizontal coordinate of the luma sample and the vertical coordinate of the luma sample.

12. The apparatus of clause 11, wherein in determining the vertical coordinate of the luma sample, the one or more processors are further configured to execute the instructions to cause the apparatus to perform:
determining a first vertical coordinate among three values associated with the vertical coordinate of the chroma sample based on the classification method to be used;
determining the vertical coordinate of the luma sample based on the first vertical coordinate and the index, wherein
in response to the index being equal to 0, the vertical coordinate of the luma sample is set to be the first vertical coordinate; and
in response to the index being greater than 0, a second vertical coordinate associated with a fourth line above a horizontal coding tree unit (CTU) boundary is determined,
when a distance between the first vertical coordinate and the horizontal CTU boundary is less than or equal to a distance between the second vertical coordinate and the horizontal CTU boundary, the vertical coordinate of the luma sample is set to be the first vertical coordinate, and
when the distance between the first vertical coordinate and the horizontal CTU boundary is greater than the distance between the second vertical coordinate and the horizontal CTU boundary, the vertical coordinate of the luma sample is set to be the second vertical coordinate.

13. The apparatus of clause 11 or 12, wherein the classification method to be used is indicated by a flag.

14. The apparatus of clause 8, wherein in determining an offset based on the classification, the one or more processors are further configured to execute the instructions to cause the apparatus to perform:
determining the offset based on the index, wherein
in response to the index being equal to 0, the offset is determined based on the classification; and
in response to the index being greater than 0, the offset is set equal to 0.

15. A non-transitory computer readable medium that stores a set of instructions that is executable by one or more processors of an apparatus to cause the apparatus to initiate a method for performing video data processing, the method comprising:
determining an index based on a vertical coordinate of a chroma sample within a picture;
determining a luma sample based on the index;
classifying the chroma sample based on a reconstructed value associated with the luma sample;
determining an offset based on the classification; and
adding the offset to a reconstructed value associated with the chroma sample.

16. The non-transitory computer readable medium of claim 15, wherein the index is obtained by:

$$\text{index}=(y\%H)>=H-n\ ?(H-y-1):0$$

wherein y is the vertical coordinate of the chroma sample within the picture, H is a height associated with a coding tree unit, the n is a positive integer.

17. The non-transitory computer readable medium of clause 16, wherein the n is equal to 4.

18. The non-transitory computer readable medium of any one of clauses 15 to 17, wherein the set of instructions that is executable by one or more processors of an apparatus to cause the apparatus to further perform:
determining a horizontal coordinate of the luma sample based on a horizontal coordinate of the chroma sample and a classification method to be used;
determining a vertical coordinate of the luma sample based on the vertical coordinate of the chroma sample, the classification method to be used, and the index; and
determining the luma sample based on the horizontal coordinate of the luma sample and the vertical coordinate of the luma sample.

19. The non-transitory computer readable medium of clause 18, wherein the set of instructions that is executable by one or more processors of an apparatus to cause the apparatus to further perform:
determining a first vertical coordinate among three values associated with the vertical coordinate of the chroma sample based on the classification method to be used;
determining the vertical coordinate of the luma sample based on the first vertical coordinate and the index, wherein
in response to the index being equal to 0, the vertical coordinate of the luma sample is set to be the first vertical coordinate; and
in response to the index being greater than 0, a second vertical coordinate associated with a fourth line above a horizontal coding tree unit (CTU) boundary is determined,
when a distance between the first vertical coordinate and the horizontal CTU boundary is less than or equal to a distance between the second vertical coordinate and the horizontal CTU boundary, the vertical coordinate of the luma sample is set to be the first vertical coordinate, and when the distance between the first vertical coordinate and the horizontal CTU boundary is greater than the distance between the second vertical coordinate and the horizontal CTU boundary, the vertical coordinate of the luma sample is set to be the second vertical coordinate.

20. The non-transitory computer readable medium of clause 18 or 19, wherein the classification method to be used is indicated by a flag.

21. The non-transitory computer readable medium of clause 15, wherein the set of instructions that is executable by one or more processors of an apparatus to cause the apparatus to further perform:

determining the offset based on the index, wherein in response to the index being equal to 0, the offset is determined based on the classification; and in response to the index being greater than 0, the offset is set equal to 0.

In some embodiments, a non-transitory computer-readable storage medium is also provided. In some embodiments, the medium can store all or portions of the video bitstream having a flag that indicates whether a combination of BO and EO being used for CC SAO. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video data processing method comprising:

determining a first index based on a position of a chroma sample and a height associated with a coding tree unit;

determining a position of a luma sample based on the first index;

determining a second index based on a value associated with the position of the luma sample;

determining an offset based on the second index; and adding the offset to a value associated with the chroma sample, wherein determining the second index based on the value associated with the position of the luma sample further comprises:

determining a third index indicating a category used for an edge offset (E) method;

determining a first offset for a horizontal position based on the third index for a first neighboring luma sample;

determining a second offset for a vertical position based on the first index and the third index for the first neighboring luma sample;

determining a first value based on the position of the luma sample, the first offset and the second offset;

determining a first difference between the value associated with the position of the luma sample and the first value;

determining a third offset for the horizontal position based on the third index for a second neighboring luma sample;

determining a fourth offset for the vertical position based on the first index and the third index for the second neighboring luma sample;

determining a second value based on the position of the luma sample, the third offset and the fourth offset;

determining a second difference between the value associated with the position of the luma sample and the second value; and determining the second index based on the first difference and the second difference.

2. The method according to claim 1, wherein determining the first index further comprises:
    determining the first index based on a module operation of a vertical position of the chroma sample and the height associated with the coding tree unit.

3. The method according to claim 1, wherein determining the position of the luma sample based on the first index further comprises:
    determining a horizontal position of the luma sample based on a horizontal position of the chroma sample; and
    determining a vertical position of the luma sample based on a vertical position of the chroma sample and the first index.

4. The method according to claim 3, wherein determining the vertical position of the luma sample based on the vertical position of the chroma sample and the first index further comprises:
    determining the vertical position of the luma sample among three values associated with the vertical position of the chroma sample based on the first index.

5. An apparatus for performing video data processing, the apparatus comprising:
    a memory configured to store instructions; and
    one or more processors configured to execute the instructions to cause the apparatus to perform operations comprising:
        determining a first index based on a position of a chroma sample and a height associated with a coding tree unit;
        determining a position of a luma sample based on the first index;
        determining a second index based on a value associated with the position of the luma sample;
        determining an offset based on the second index; and
        adding the offset to a value associated with the chroma sample, wherein determining the second index based on the value associated with the position of the luma sample further comprises:
            determining a third index indicating a category used for an edge offset (EO) method;
            determining a first offset for a horizontal position based on the second index for a first neighboring luma sample;
            determining a second offset for a vertical position based on the first index and the third index for the first neighboring luma sample;
            determining a first value based on the position of the luma sample, the first offset and the second offset;
            determining a first difference between the value associated with the position of the luma sample and the first value;
            determining a third offset for the horizontal position based on the third index for a second neighboring luma sample;
            determining a fourth offset for the vertical position based on the first index and the third index for the second neighboring luma sample;
            determining a second value based on the position of the luma sample, the third offset and the fourth offset;
            determining a second difference between the value associated with the position of the luma sample and the second value; and
            determining the second index based on the first difference and the second difference.

6. The apparatus according to claim 5, wherein determining the first index further comprises:
    determining the first index based on a module operation of a vertical position of the chroma sample and the height associated with the coding tree unit.

7. The apparatus according to claim 5, wherein determining the position of the luma sample based on the first index further comprises:
    determining a horizontal position of the luma sample based on a horizontal position of the chroma sample; and
    determining a vertical position of the luma sample based on a vertical position of the chroma sample and the first index.

8. The apparatus according to claim 7, wherein determining the vertical position of the luma sample based on the vertical position of the chroma sample and the first index further comprises:
    determining the vertical position of the luma sample among three values associated with the vertical position of the chroma sample based on the first index.

9. A non-transitory computer readable medium that stores a set of instructions that is executable by one or more processors of an apparatus to cause the apparatus to performing operations comprising:
    determining a first index based on a position of a chroma sample and a height associated with a coding tree unit;
    determining a position of a luma sample based on the first index;
    determining a second index based on a value associated with the position of the luma sample;
    determining an offset based on the second index; and
    adding the offset to a value associated with the chroma sample, wherein determining the second index based on the value associated with the position of the luma sample further comprises:
        determining a third index indicating a category used for an edge offset (EO) method;
        determining a first offset for a horizontal position based on the third index for a first neighboring luma sample;
        determining a second offset for a vertical position based on the first index and the third index for the first neighboring luma sample;
        determining a first value based on the position of the luma sample, the first offset and the second offset;
        determining a first difference between the value associated with the position of the luma sample and the first value;
        determining a third offset for the horizontal position based on the third index for a second neighboring luma sample;
        determining a fourth offset for the vertical position based on the first index and the third index for the second neighboring luma sample;
        determining a second value based on the position of the luma sample, the third offset and the fourth offset;
        determining a second difference between the value associated with the position of the luma sample and the second value; and
        determining the second index based on the first difference and the second difference.

10. The non-transitory computer readable medium according to claim 9, wherein determining the first index further comprises:

determining the first index based on a module operation of a vertical position of the chroma sample and the height associated with the coding tree unit.

11. The non-transitory computer readable medium according to claim 9, wherein determining the position of the luma sample based on the first index further comprises:

determining a horizontal position of the luma sample based on a horizontal position of the chroma sample; and determining a vertical position of the luma sample based on a vertical position of the chroma sample and the first index.

* * * * *